(12) United States Patent
Brant et al.

(10) Patent No.: US 8,058,371 B2
(45) Date of Patent: *Nov. 15, 2011

(54) SUPER-SOLUTION HOMOGENEOUS PROPYLENE POLYMERIZATION

(75) Inventors: Patrick Brant, Seabrook, TX (US); Gary L. Casty, Easton, PA (US); Gabor Kiss, Hampton, NJ (US); Raymond A. Cook, Bethlehem, PA (US); James R. Lattner, LaPorte, TX (US)

(73) Assignee: Exxonmobil Chemical Patents Inc., Houston, TX (US)

(*) Notice: Subject to any disclaimer, the term of this patent is extended or adjusted under 35 U.S.C. 154(b) by 590 days.

This patent is subject to a terminal disclaimer.

(21) Appl. No.: 12/098,907

(22) Filed: Apr. 7, 2008

(65) Prior Publication Data

US 2008/0188635 A1 Aug. 7, 2008

Related U.S. Application Data

(63) Continuation-in-part of application No. 10/667,585, filed on Sep. 22, 2003, now Pat. No. 7,354,979.

(60) Provisional application No. 60/412,541, filed on Sep. 20, 2002, provisional application No. 60/933,007, filed on Jun. 4, 2007.

(51) Int. Cl.
*C08F 4/6592* (2006.01)
*C08F 2/06* (2006.01)
*C08F 110/06* (2006.01)
*C08F 210/06* (2006.01)

(52) U.S. Cl. ......... 526/160; 526/170; 526/348; 526/351

(58) Field of Classification Search .................. 526/160, 526/170, 348, 351
See application file for complete search history.

(56) References Cited

U.S. PATENT DOCUMENTS

| | | |
|---|---|---|
| 2,153,553 A | 4/1939 | Fawcett et al. |
| 2,852,501 A | 10/1954 | Richard, Jr. et al. |
| 3,056,771 A | 10/1962 | Aldridge et al. |
| 3,294,772 A | 12/1966 | Cottle |
| 3,470,143 A | 9/1969 | Schrage et al. |
| 3,678,088 A | 7/1972 | Hedberg et al. |
| 3,725,378 A | 4/1973 | Chamberlin |
| 4,135,044 A | 1/1979 | Beals |
| 4,153,774 A | 5/1979 | Boettcher et al. |
| 4,337,142 A | 6/1982 | Knudson et al. |
| 4,530,914 A | 7/1985 | Ewen et al. |
| 4,588,790 A | 5/1986 | Jenkins, III et al. |
| 4,740,550 A | 4/1988 | Foster |
| 4,769,510 A | 9/1988 | Kaminsky et al. |
| 4,794,004 A | 12/1988 | Pfleger et al. |
| 4,794,096 A | 12/1988 | Ewen |
| 4,962,262 A | 10/1990 | Winter et al. |
| 5,026,798 A | 6/1991 | Canich |
| 5,081,322 A | 1/1992 | Winter et al. |
| 5,084,534 A | 1/1992 | Welborn, Jr. et al. |
| 5,096,867 A | 3/1992 | Canich |
| 5,236,998 A | 8/1993 | Lundeen et al. |
| 5,272,236 A | 12/1993 | Lai et al. |
| 5,324,799 A | 6/1994 | Yano et al. |
| 5,324,800 A | 6/1994 | Welborn, Jr. et al. |
| 5,326,835 A | 7/1994 | Ahvenainen et al. |
| 5,328,969 A | 7/1994 | Winter et al. |
| 5,332,706 A | 7/1994 | Nowlin et al. |
| 5,352,749 A | 10/1994 | DeChellis et al. |
| 5,382,630 A | 1/1995 | Stehling et al. |
| 5,382,631 A | 1/1995 | Stehling et al. |
| 5,391,654 A | 2/1995 | Ahvenainen et al. |
| 5,405,922 A | 4/1995 | DeChellis et al. |
| 5,408,017 A | 4/1995 | Turner et al. |
| 5,416,153 A | 5/1995 | Winter et al. |
| 5,434,116 A | 7/1995 | Sone et al. |
| 5,455,365 A | 10/1995 | Winter et al. |
| 5,466,766 A | 11/1995 | Patsidis et al. |
| 5,468,810 A | 11/1995 | Hayakawa et al. |
| 5,489,659 A | 2/1996 | Sugano et al. |
| 5,504,171 A | 4/1996 | Etherton et al. |
| 5,504,232 A | 4/1996 | Winter et al. |

(Continued)

FOREIGN PATENT DOCUMENTS

CA 2118711 3/1993

(Continued)

OTHER PUBLICATIONS

Barbro Lofgren et al., Metallocene-PP Produced Under Supercritical Conditions (ABSTRACT), 1st BlueSky Conference on Catalytic Olefin Polymerization, Jun. 17-20, 2002, Sorrento, Italy. Colin J. Schaverien, et al., Ethylene Bis(2-indenyl) Zirconocenes: A New Class of Diastereomeric Metallocenes for the (Co)Polymerization of α-Olefins, Organometallics, 2001, vol. 20, No. 16, pp. 3436-3452.
Noriyuki Suzuki et al., Olefin Polymerization using Highly Congested ansa-Metallocenes under High Pressure: Formation of Superhigh Molecular Weight Polyolefins, Macromolecules, 2000, vol. 33, No. 3, pp. 754-759.
Author Unknown, Operation of the Reactor with a Sealed Electric Motor in Manufacture of Ditolyethane.
Hauptman, et al., Stereoblock Polypropylene: Ligand Effects on the Stereospecificity of 2-Arylindene Zirconocene Catalysts, J. Am. Chem. Soc., 1995, vol. 117, pp. 11586-11587.
Lahelin et al., Propylene Polymerization with rac-SiMe$_2$(2-ME-4-PhInd)$_2$ZrMe$_2$/MAO: Polymer Characterization and Kinetic Models, Macromol. Chem. Phys., 2003, v. 204, pp. 1323-1337.
Larsonneur et al., Synthesis, Characterization, and Chemical Reactivity of Zirconium Dihydride $(C_5H_4R)_2Zr(\mu-H)H_2$ (R = SiMe$_3$, CMe$_3$). H/D Exchange Reactions of Anionic Species $[(C_5H_4R)_2ZrH_2]$. X-ray Crystal Structure of $[(C_5H_4SiMe_3)_2Zr(\mu-H)H]_2$, Organometallics, 1993, vol. 12, pp. 3216-3224.

(Continued)

Primary Examiner — Roberto Rabago

(57) ABSTRACT

Processes for polymerizing propylene. About 40 wt % to about 80 wt % propylene monomer, based on total weight of propylene monomer and diluent, and about 20 wt % to about 60 wt % diluent, based on total weight of propylene monomer and diluent, can be fed into a reactor. The propylene monomer can be polymerized in the presence of a metallocene catalyst and an activator within the reactor at a temperature of about 80° C. or more and a pressure of about 13 MPa or more to produce a polymer product in a homogenous system. About 20 wt % to about 76 wt % (preferably About 28 wt % to about 76 wt %) propylene monomer, based on total weight of the propylene monomer, diluent, and polymer product, can be present at the reactor exit at steady state conditions.

36 Claims, 7 Drawing Sheets

U.S. PATENT DOCUMENTS

| | | | |
|---|---|---|---|
| 5,514,761 | A | 5/1996 | Etherton et al. |
| 5,585,509 | A | 12/1996 | Langhauser et al. |
| 5,652,308 | A | 7/1997 | Merrill et al. |
| 5,670,595 | A | 9/1997 | Meka et al. |
| 5,672,668 | A | 9/1997 | Winter et al. |
| 5,693,730 | A | 12/1997 | Kuber et al. |
| 5,693,836 | A | 12/1997 | Winter et al. |
| 5,710,223 | A | 1/1998 | Fukuoka et al. |
| 5,723,560 | A | 3/1998 | Canich |
| 5,723,705 | A | 3/1998 | Herrmann et al. |
| 5,756,608 | A | 5/1998 | Langhauser et al. |
| 5,763,542 | A | 6/1998 | Winter et al. |
| 5,780,565 | A | 7/1998 | Clough et al. |
| 5,840,644 | A | 11/1998 | Kuber et al. |
| 5,866,663 | A | 2/1999 | Brookhart et al. |
| 5,882,750 | A | 3/1999 | Mink et al. |
| 5,936,053 | A | 8/1999 | Fukuoka et al. |
| 5,962,719 | A | 10/1999 | Winter et al. |
| 5,965,674 | A | 10/1999 | Moen et al. |
| 5,969,062 | A | 10/1999 | Moll et al. |
| 5,998,547 | A | 12/1999 | Hohner |
| 6,028,152 | A | 2/2000 | Winter et al. |
| 6,034,022 | A | 3/2000 | McAdon et al. |
| 6,051,522 | A | 4/2000 | Rohrmann et al. |
| 6,057,408 | A | 5/2000 | Winter et al. |
| 6,084,041 | A | 7/2000 | Andtsjo et al. |
| 6,084,115 | A | 7/2000 | Chen et al. |
| 6,087,292 | A | 7/2000 | Winter et al. |
| 6,124,231 | A | 9/2000 | Fritze et al. |
| 6,143,682 | A | 11/2000 | Fisher |
| 6,143,686 | A | 11/2000 | Vizzini et al. |
| 6,153,776 | A | 11/2000 | Patton et al. |
| 6,160,072 | A | 12/2000 | Ewen |
| 6,169,051 | B1 | 1/2001 | Mitani et al. |
| 6,197,910 | B1 | 3/2001 | Weng et al. |
| 6,207,756 | B1 | 3/2001 | Datta et al. |
| 6,218,488 | B1 * | 4/2001 | Schiffino et al. .............. 526/133 |
| 6,225,432 | B1 | 5/2001 | Weng et al. |
| 6,228,795 | B1 | 5/2001 | Vizzini |
| 6,255,410 | B1 | 7/2001 | Shigekauzu et al. |
| 6,268,444 | B1 | 7/2001 | Klosin et al. |
| 6,291,699 | B1 | 9/2001 | Birmingham et al. |
| 6,300,451 | B1 | 10/2001 | Mehta et al. |
| 6,326,493 | B1 | 12/2001 | Mitani et al. |
| 6,355,741 | B1 | 3/2002 | Marechai |
| 6,359,095 | B1 | 3/2002 | Winter et al. |
| 6,362,356 | B1 | 3/2002 | Repo et al. |
| 6,372,847 | B1 | 4/2002 | Wouters |
| 6,399,723 | B1 | 6/2002 | Burkhardt et al. |
| 6,451,938 | B1 | 9/2002 | Fisher et al. |
| 6,458,982 | B1 | 10/2002 | Schottek et al. |
| 6,465,700 | B1 | 10/2002 | Sullivan et al. |
| 6,469,188 | B1 | 10/2002 | Miller et al. |
| 6,479,424 | B1 | 11/2002 | Ernst et al. |
| 6,479,646 | B1 | 11/2002 | Nakano et al. |
| 6,482,902 | B1 | 11/2002 | Bohnen et al. |
| 6,492,473 | B1 | 12/2002 | Canich et al. |
| 6,492,539 | B1 | 12/2002 | Bingel et al. |
| 6,521,727 | B2 | 2/2003 | Eilerts et al. |
| 6,525,157 | B2 | 2/2003 | Cozewith et al. |
| 6,562,914 | B1 | 5/2003 | Andtsjo et al. |
| 6,562,920 | B2 | 5/2003 | Brant |
| 6,576,306 | B2 | 6/2003 | Mehta et al. |
| 6,583,277 | B2 | 6/2003 | Luo et al. |
| 6,620,896 | B1 | 9/2003 | Killian et al. |
| 6,635,779 | B1 | 10/2003 | Ewen et al. |
| 6,642,316 | B1 | 11/2003 | Datta et al. |
| 6,689,847 | B2 | 2/2004 | Mawson et al. |
| 6,737,487 | B2 | 5/2004 | Meverden |
| 6,770,714 | B2 | 8/2004 | Ommundsen et al. |
| 6,881,800 | B2 | 4/2005 | Friedersdorf |
| 6,969,490 | B2 | 11/2005 | Marx et al. |
| 7,022,780 | B2 | 4/2006 | Marx et al. |
| RE39,156 | E | 7/2006 | Winter et al. |
| 7,087,690 | B2 | 8/2006 | Boussie et al. |
| 7,163,989 | B2 | 1/2007 | Friedersdorf |
| 7,214,746 | B2 | 5/2007 | Voskoboynikov et al. |
| 7,214,747 | B2 | 5/2007 | Voskoboynikov et al. |
| 7,265,193 | B2 | 9/2007 | Weng et al. |
| 7,276,567 | B2 | 10/2007 | Voskoboynikov et al. |
| 7,279,536 | B2 | 10/2007 | Brant et al. |
| 7,319,125 | B2 | 1/2008 | Arjunan et al. |
| 7,351,779 | B2 | 4/2008 | Iaccino et al. |
| 7,354,979 | B2 | 4/2008 | Brant et al. |
| 7,429,634 | B2 * | 9/2008 | Brant et al. ..................... 526/64 |
| 7,446,216 | B2 | 11/2008 | Voskoboynikov et al. |
| 7,538,168 | B2 | 5/2009 | Voskoboynikov et al. |
| 7,550,544 | B2 | 6/2009 | Voskoboynikov et al. |
| 7,557,171 | B2 | 7/2009 | Voskoboynikov et al. |
| 7,667,064 | B2 | 2/2010 | Voskoboynikov et al. |
| 7,709,670 | B2 | 5/2010 | Voskoboynikov et al. |
| 2001/0031834 | A1 | 10/2001 | Ushioda et al. |
| 2001/0044505 | A1 | 11/2001 | Ford et al. |
| 2001/0044506 | A1 | 11/2001 | Mehta et al. |
| 2001/0053833 | A1 | 12/2001 | Nakano et al. |
| 2002/0002261 | A1 | 1/2002 | Yahata et al. |
| 2002/0004575 | A1 | 1/2002 | Cozewith et al. |
| 2002/0013440 | A1 | 1/2002 | Agarwal et al. |
| 2002/0016415 | A1 | 2/2002 | Laughner et al. |
| 2002/0065379 | A1 | 5/2002 | Murray |
| 2002/0096797 | A1 | 7/2002 | Stoffelsma et al. |
| 2002/0156279 | A1 | 10/2002 | Boussie et al. |
| 2002/0193535 | A1 | 12/2002 | Meverden et al. |
| 2003/0032549 | A1 | 2/2003 | Vogel |
| 2003/0088021 | A1 | 5/2003 | Van Dun et al. |
| 2004/0024146 | A1 | 2/2004 | Friedersdorf |
| 2004/0024148 | A1 | 2/2004 | Meverden |
| 2004/0122191 | A1 | 6/2004 | Arjunan et al. |
| 2004/0127654 | A1 | 7/2004 | Brant et al. |
| 2004/0132935 | A1 | 7/2004 | Arjunan et al. |
| 2004/0152882 | A1 | 8/2004 | Ekhom et al. |
| 2004/0158010 | A1 | 8/2004 | Lehmus et al. |
| 2004/0158015 | A1 | 8/2004 | Senninger |
| 2004/0242734 | A1 | 12/2004 | Lakeman et al. |
| 2004/0260107 | A1 | 12/2004 | Oberhoff et al. |
| 2005/0042294 | A1 | 2/2005 | Thanoo et al. |
| 2005/0090384 | A1 | 4/2005 | Wang et al. |
| 2006/0009595 | A1 | 1/2006 | Rix et al. |
| 2006/0025545 | A1 | 2/2006 | Brant et al. |
| 2006/0096175 | A1 | 5/2006 | Russell et al. |
| 2006/0134221 | A1 | 6/2006 | Geall |
| 2006/0167195 | A1 | 7/2006 | Resconi et al. |
| 2006/0183861 | A1 | 8/2006 | Harrington et al. |
| 2006/0183881 | A1 | 8/2006 | Ibar |
| 2006/0211832 | A1 | 9/2006 | Brant et al. |
| 2006/0293474 | A1 | 12/2006 | Brant et al. |
| 2007/0135596 | A1 | 6/2007 | Voskoboynikov et al. |
| 2007/0135597 | A1 | 6/2007 | Voskoboynikov et al. |
| 2007/0135623 | A1 | 6/2007 | Voskoboynikov et al. |
| 2007/0255018 | A1 | 11/2007 | Brant |
| 2008/0090974 | A1 | 4/2008 | Brant et al. |
| 2008/0153996 | A1 | 6/2008 | Friedersdorf et al. |
| 2008/0153997 | A1 | 6/2008 | Casty et al. |
| 2008/0188635 | A1 | 8/2008 | Brant et al. |
| 2008/0211832 | A1 | 9/2008 | Kumon |
| 2008/0214767 | A1 | 9/2008 | Mehta et al. |
| 2008/0234443 | A1 | 9/2008 | Kiss et al. |
| 2009/0076214 | A1 | 3/2009 | Kiss et al. |
| 2009/0076216 | A1 | 3/2009 | Kiss et al. |
| 2009/0163642 | A1 | 6/2009 | Kiss et al. |
| 2009/0163643 | A1 | 6/2009 | Kiss et al. |
| 2009/0163678 | A1 | 6/2009 | Kiss et al. |
| 2009/0186995 | A1 | 7/2009 | Canich et al. |
| 2009/0292085 | A1 | 11/2009 | Kiss et al. |
| 2010/0063338 | A1 | 3/2010 | Kiss et al. |

FOREIGN PATENT DOCUMENTS

| | | |
|---|---|---|
| CA | 2103694 | 2/1994 |
| DE | 300291 | 3/1988 |
| DE | 4426569 | 7/1994 |
| DE | 19823168 | 5/1998 |
| EP | 0 089 691 | 9/1983 |
| EP | 0 129 368 | 12/1984 |
| EP | 129 368 | 7/1989 |
| EP | 0 416 815 | 3/1991 |
| EP | 0 480 190 | 4/1992 |
| EP | 0 459 320 | 11/1992 |

| | | |
|---|---|---|
| EP | 0 517 183 | 12/1992 |
| EP | 0 530 908 | 3/1993 |
| EP | 0 552 945 | 7/1993 |
| EP | 0 577 581 | 1/1994 |
| EP | 0 582 195 | 2/1994 |
| EP | 0 584 609 | 3/1994 |
| EP | 0 603 232 | 6/1994 |
| EP | 0 628 566 | 12/1994 |
| EP | 0 645 401 | 3/1995 |
| EP | 0 666 267 | 8/1995 |
| EP | 0 667 359 | 8/1995 |
| EP | 0 670 325 | 9/1995 |
| EP | 0 693 502 | 1/1996 |
| EP | 0 714 923 | 6/1996 |
| EP | 0 718 324 | 6/1996 |
| EP | 0 742 227 | 11/1996 |
| EP | 0 806 436 | 11/1997 |
| EP | 0 846 696 | 6/1998 |
| EP | 0 882 078 | 12/1998 |
| EP | 0 882 731 | 12/1998 |
| EP | 0 887 379 | 12/1998 |
| EP | 0 887 380 | 12/1998 |
| EP | 0 942 017 | 9/1999 |
| EP | 0 957 113 | 11/1999 |
| EP | 0 987 279 | 3/2000 |
| EP | 1 008 607 | 6/2000 |
| EP | 1 033 371 | 9/2000 |
| EP | 1 138 687 | 10/2001 |
| EP | 1 193 275 | 4/2002 |
| EP | 1 195 391 | 4/2002 |
| EP | 1 231 226 | 8/2002 |
| EP | 1 323 746 | 7/2003 |
| GB | 1 443 394 | 7/1976 |
| JP | 06-025357 | 2/1994 |
| JP | 07-216011 | 8/1995 |
| JP | 08-127612 | 5/1996 |
| JP | 3323347 | 7/1996 |
| JP | 08-208535 | 8/1996 |
| JP | 96-208535 | 8/1996 |
| JP | 08-301914 | 11/1996 |
| JP | 09-216916 | 8/1997 |
| JP | 10-045834 | 2/1998 |
| JP | 10-110003 | 4/1998 |
| JP | 1998-110003 | 4/1998 |
| JP | 3421202 | 4/1998 |
| JP | 1998-341202 | 12/1998 |
| JP | 11-001508 | 1/1999 |
| JP | 11-060588 | 3/1999 |
| JP | 11-080183 | 3/1999 |
| JP | 11-171925 | 6/1999 |
| JP | 3421202 | 4/2003 |
| PL | 281277 | 3/1991 |
| WO | WO 88/02376 | 4/1988 |
| WO | WO 88/04672 | 6/1988 |
| WO | WO 91/04257 | 4/1991 |
| WO | WO 92/14766 | 9/1992 |
| WO | WO 93/05082 | 3/1993 |
| WO | WO 93/11171 | 6/1993 |
| WO | WO 93/05082 | 8/1993 |
| WO | WO 94/00500 | 1/1994 |
| WO | WO 95/04087 | 2/1995 |
| WO | WO 95/25757 | 9/1995 |
| WO | WO 96/00246 | 1/1996 |
| WO | WO 96/04317 | 2/1996 |
| WO | WO 96/12744 | 5/1996 |
| WO | WO 96/18662 | 6/1996 |
| WO | WO 96/33227 | 10/1996 |
| WO | WO 96/34023 | 10/1996 |
| WO | WO 96/38458 | 12/1996 |
| WO | WO 97/03124 | 1/1997 |
| WO | WO 97/11098 | 3/1997 |
| WO | WO 97/13790 | 4/1997 |
| WO | WO 97/44391 | 11/1997 |
| WO | WO 97/45434 | 12/1997 |
| WO | WO 97/48737 | 12/1997 |
| WO | WO 98/13393 | 4/1998 |
| WO | WO 98/33823 | 8/1998 |
| WO | WO 98/49229 | 11/1998 |
| WO | WO 99/11680 | 3/1999 |
| WO | WO 99/26985 | 6/1999 |
| WO | WO 99/29749 | 6/1999 |
| WO | WO 99/40129 | 8/1999 |
| WO | WO 99/41289 | 8/1999 |
| WO | WO 99/42467 | 8/1999 |
| WO | WO 99/43717 | 9/1999 |
| WO | WO 99/61488 | 12/1999 |
| WO | WO 00/06621 | 2/2000 |
| WO | WO 00/12565 | 3/2000 |
| WO | WO 00/12572 | 3/2000 |
| WO | WO 00/24613 | 5/2000 |
| WO | WO 00/25916 | 5/2000 |
| WO | WO 00/26266 | 5/2000 |
| WO | WO 00/37514 | 6/2000 |
| WO | WO 00/40625 | 7/2000 |
| WO | WO 00/43406 | 7/2000 |
| WO | WO 00/50475 | 8/2000 |
| WO | WO 00/64952 | 11/2000 |
| WO | WO 00/69871 | 11/2000 |
| WO | WO 01/44318 | 6/2001 |
| WO | WO 01/46273 | 6/2001 |
| WO | WO 01/57095 | 8/2001 |
| WO | WO 02/00744 | 1/2002 |
| WO | WO 02/34795 | 5/2002 |
| WO | WO 02/38628 | 5/2002 |
| WO | WO 02/44260 | 6/2002 |
| WO | WO 02/50145 | 6/2002 |
| WO | WO 02/070572 | 9/2002 |
| WO | WO 02/083753 | 10/2002 |
| WO | WO 02/090399 | 11/2002 |
| WO | WO 02/098930 | 12/2002 |
| WO | WO 03/040095 | 5/2003 |
| WO | WO 03/040195 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/013194 | 2/2004 |
| WO | WO 2004/024740 | 3/2004 |
| WO | WO 2004/026921 | 4/2004 |
| WO | WO 2004/026923 | 4/2004 |
| WO | WO 2004/026925 | 4/2004 |
| WO | WO 2004/033510 | 4/2004 |
| WO | WO 2004/052950 | 4/2004 |
| WO | WO 2004/050724 | 6/2004 |
| WO | WO 2004/052950 | 6/2004 |
| WO | WO 2004/060941 | 7/2004 |
| WO | WO 2005/113610 | 12/2005 |
| WO | WO 2005/113615 | 12/2005 |
| WO | WO 2006/002132 | 1/2006 |
| WO | WO 2006/009942 | 1/2006 |
| WO | WO 2006/009944 | 1/2006 |
| WO | WO 2006/009945 | 1/2006 |
| WO | WO 2006/009946 | 1/2006 |
| WO | WO 2006/009949 | 1/2006 |
| WO | WO 2006/009951 | 1/2006 |
| WO | WO 2006/009976 | 1/2006 |
| WO | WO 2006/009977 | 1/2006 |
| WO | WO 2006/009979 | 1/2006 |
| WO | WO 2006/009980 | 1/2006 |
| WO | WO 2006/009981 | 1/2006 |
| WO | WO 2006/019494 | 2/2006 |
| WO | WO 2006/025917 | 3/2006 |
| WO | WO 2006/025949 | 3/2006 |
| WO | WO 2006/028549 | 3/2006 |
| WO | WO 2006/044149 | 4/2006 |
| WO | WO 2006/083303 | 8/2006 |
| WO | WO 2006/097497 | 9/2006 |
| WO | WO 2006/097500 | 9/2006 |
| WO | WO 2006/120177 | 11/2006 |
| WO | WO 2006/130046 | 12/2006 |
| WO | WO 2006/134046 | 12/2006 |
| WO | WO 2007/037944 | 4/2007 |
| WO | WO 2007/107448 | 9/2007 |
| WO | WO 2007/116034 | 10/2007 |
| WO | WO 2009/082468 | 7/2009 |

OTHER PUBLICATIONS

Wunderlich, Editor, Thermal Analysis, Academic Press Inc., 1990, pp. 418.

U.S. Appl. No. 12/074,496, filed Mar. 4, 2008, Gabor Kiss et al.
U.S. Appl. No. 60/933,007, filed Jun. 4, 2007, Brant et al.
U.S. Appl. No. 60/937,929, filed Jun. 29, 2007, Kiss et al.
U.S. Appl. No. 61/004,336, filed Nov. 27, 2007, Deffenbaugh et al.
Author Unknown, Operation of the Reactor with a Sealed Electric Motor in Manufacture of Ditolylethane, 1965.
Author Unknown, "Propylene Supercritical Polymerization Tests in Yangzi Make Breakthrough" China Chemical Reporter, vol. 15, Apr. 6, 2005.
Alt et al., Effect of the Nature of Metallocene Complexes of Group IV Metals on Their Performance in Catalytic Ethylene and Propylene Polymerization, Chem. Rev. 100, 2000, pp. 1205-1221.
Alt et al., Syndiospecific Polymerization of Propylene: Synthesis of $CH_2$—and CHR-Bridged Fluorenyl-Containing Ligand Precursors for Metallocene Complexes of Type $(C_{13}H_{8-n}R'_nCHR-C_5H_4)ZrCl_2$ (n = 0, 2; R = H, Alkyl; R' = H, Hal), Journal of Organometallic Chemistry, 1996, vol. 526, No. 2, pp. 295-301.
Alt et al., Syndiospezifische Polymerisation von Propylen: 2- and 2,7—substituierte Metallocenkomplex des typs $(C_{13}H_{8-n}R_nCR'_2C_5H_4)$ $MCl_2$(n= 1,2; R = Alkoxy, Alkyl, Aryl, Hal; R' = Me, Ph; M = Zr, Hf)[1], Journal of Organometallic Chemistry, 1996, vol. 522, No. 1, pp. 39-54.
Akimoto et al., New Developments in the Production of Metallocene LLDPE by High pressure Polymerization, Tosoh Corp., Metallocene-Based Polyolefins 2000 (conference proceedings), pp. 287-308 (John Wiley & Sons Ltd.).
Bandy et al., Polymerisation of Ethylene and Propene Using New chiral Zirconium Derivatives, Crystal Structure of $[ZrL^1Cl_2][H_2L^1=(4S,5S)$-trans-4,5-bis(1H-inden-1-ylmethyl)-2,2-dimethyl-1,3-dioxoland], J. Chem. Soc., Dalton Trans., 1991, pp. 2207-2216.
Barnhart et al., Synthesis of Branched Polyolefins Using a Combination of Homogeneous Metallocene Mimics, J. Am. Chem. Soc., 1998, vol. 120, pp. 1082-1083.
Bergemann et al., Copolymerization of Ethylene and Linear α-Olefins with a Metallocene Catalyst System under High Pressure, Part II. Comparison of Propene, 1-Butene, 1-Hexene, and 1-Decene, J. Mol. Catal. A: Chemical 105, 1996, pp. 87-91.
Bergemann et al., Copolymerization of Ethylene and 1,5-Hexadiene Under High Pressure Catalyzed by a Metallocene, Journal of Molecular Catalysis A: Chemical, 116, 1997, pp. 317-322.
Bergemann et al., Journal of Molecular Catalysis A: Chemical 102, 1995, pp. 1-5.
Britovsek et al., The Search for New-Generation Olefin Polymerization Catalysts: Life Beyond Metallocenes, Chemie Intl. Edn., 1999, vol. 38, pp. 428-447.
Bujadoux, Use of Bridged and Non-Bridged Metallocene Catalysts in High Pressure/High Temperature Ethylene/α-Olefin Copolymerization, Metallocenes 95 Intl. Congr., Metallocene Polym., 1995, pp. 375-402, Scotland Bus. Rsrch. Publ.
Chen et al., Cocatalysts for Metal-Catalyzed Olefin Polymerization: Activators, Activation Processes, and Structure-Activity Relationships, Chem. Rev., 2000, vol. 100, pp. 1391-1434.
Coates, et al., Oscillating Stereocontrol: A Strategy for the Synthesis of Thermoplastic Elastomeric Polypropylene, Science, 1995, vol. 267, pp. 217-219.
Coates, Precise Control of Polyolefin Stereochemistry Using Single Site Metal Catalysts, Chem. Rev. 100, 2000, pp. 1223-1252.
Conway et al., Formation and Reactivity of Halogen Derivatives of (η5-Cyclopentadienyl)thallium, Organometallics, 1985, vol. 4, pp. 688-693.
Cottom, Waxes, in Encyclo. Chem. Tech., vol. 25, pp. 614-626, 4th Ed.
Dassaud et al., Copolymerization of Propene-Nonconjugated Dienes: Derivatization Through Hydroboration and Epoxydation, Polym. Adv. Technol., 4(7), 1993, pp. 457-464.
Dreier, et al., 2-Hetaryl-Substituted Bis(indenyl)zirconium Complexes as Catalyst Precursors for Elastomeric Polypropylene Formation, Organometallics, 2000, vol. 19, pp. 4095-4103.
Dreier, et al., Group 4 Metallocenes Containing Hetaryl Substituents at Their π-ligands: Synthesis and Characterization of the Parent bis[2-(2-furyl)indenyl]zirconocene system, J. Organometallic Chem., 2001, vol. 622, pp. 143-148.

Dreier, et al., Conformational features of a furyl-substituted bis(tetrahydroindynyl)zirconium dichloride system, J. Phys. Org. Chem., 2002, vol. 15, pp. 582-589.
Dreier et al., Structural and Dynamic Features of Bis[2-(2-furyl)indenyl]zirconium Derivatives, Organometallics, 2001, vol. 20, pp. 5067-5075.
Eckstein et al., Determination of Plateau Moduli and Entanglement Molecular Weights of Isotactic, Syndiotactic, and Atactic Polypropylenes Synthesized with Metallocene Catalysts, Macromolecules, 31, 1998, pp. 1335-1340.
Erker et al., Hydroboration of Bis(alkenylcyclopentadienyl)zirconium Dichlorides[1]), Chemische Berichte, 1991, vol. 124, pp. 1301-1310.
Erker et al., Cp-Substituent Additivity Effects controlling the Stereochemistry of the Propene Polymerization Reaction at Conformationally Unrestricted $(Cp-CHR^1R^2)_2ZrCl_2/$ Methylalumoxane Catalysts, J. Am. Chem. Soc., 1991, vol. 113, pp. 7594-7602.
Erker et al., Synthesis of ansa-Metallocenes by Intramolecular Photochemical [2 = 2] Cycloaddition of Bis(alkenylcyclopentadienyl)zirconium Complexes, Organometallics, 1993, vol. 12, pp. 2140-2151.
Ewen et al., Syndiospecific Propylene Polymerizations with Group 4 Metallocenese, J. Am. Chem. Soc., 1988, vol. 110, pp. 6255-6256.
Finch et al., Substituent Effects on the cleavage Rates of Titanocene Metallacyclobutanes, Journal of the American Chemical Society, Washington, DC, US, 1998, vol. 110, pp. 2406-2413.
Gotz et al., MAO-Free Metallocene Based Catalysts in High Pressure Polymerization of Ethylene and 1-Hexene, Chem. Eng. Technol., 21, 1998, pp. 954-957 (Wiley-VCH Verlag GmbH).
Hackmann et al., functional Olefin Copolymers: Uniform Architectures of Propene/7-Methyl-1,6-Octadiene Copolymers by ATR-FTIR Spectroscopy Control of Monomer Composition, Macromolecules, American Chemical Society, Easton, US, vol. 33, No. 5, Mar. 7, 2000, pp. 1524-1529 (German).
Hackmann et al., Zirconocene-MAO Catalyzed Homo- and Copolymerizations of Linear Assymetrically Substituted Dienes with Propene: A Novel Strategy of Functional (co)poly(α-olefin)s, Macromol. Chem. Phys., 1998, pp. 1511-1517 (German).
Han et al., Permercuration of Ferrocenes and Ruthenocenes. New Approaches to Complexes Bearing Perhalogenated Cyclopentadienyl Ligands, Organometallics, 1994, vol. 13, No. 8, pp. 3009-3019.
Hassan et al., Aryl-Aryl Bond Formation One Century after the Discovery of the Ullmann Reaction, Chem. Rev., 2002, vol. 102, pp. 1359-1469.
Hollis et al., Preparation and Properties of (S,S)-[Ti((R,R)-cyclacene)C12], a Chiral Strapped Bent Metallocene, Organometallics, 1992, vol. 11, pp. 2812-2816.
Ittel, et al., Late metal Catalysts for Ethylene Homo- and Copolymerization, Chem. Rev. 2000, vol. 100, pp. 1169-1203.
Janiak, Metallocene Catalysts for Olefin Polymerization, Metallocenes: Synthesis, Reactivity, and Applications, vol. 2, Wiley-VCH, 1998, pp. 547-614, A. Togni and R. L. Halterman, editors.
Johnston et al., Investigation of the Electrochemical Properties of Substituted Titanocene Dichlorides, Electrochemica Acta, 1995, vol. 40, pp. 473-477.
Kamigaito et al., Olefin Polymerization with Me4Cp-amido Complexes with Electron-withdrawing Groups, Journal of Polymer Science, Part A: Polymer Chemistry, 2000, vol. 38, No. S1, pp. 4649-4660.
Kato et al., Synthesis of Novel ansa-Metallocene Complex with Bridged Bis(indenyl) Ligand and Its Application for Olefin Polymerization, Studies in Surface and Catalysis, 1999, vol. 121 (Science and Technology in Catalysis (1998), pp. 473-476.
Kirby et al., Phase Behavior of Polymers in Supercritical Fluid Solvents, Chem. Rev., 1999, 99, pp. 565-602.
Knüppel, et al., Probing the Dynamic Features of Bis(aminocyclopentadienyl) and Bis(aminoindenyl) Zirconium Complexes, Organometallics, 2000, vol. 19, pp. 1262-1268.
Kravchenko, et al., Propylene Polymerization with Chiral and Achiral Unbridged 2-Arylindene Metallocenes, Organometallics, 1997, vol. 16, pp. 3635-3639.

Lee et al., Copolymerizations of Olefins and Dienes with Homogeneous and Heterogeneous Catalysts, Eur. Polym. J., vol. 33(4), 1997, pp. 447-451 (German).

Lehmus et al., Metallocene-PP Produced Under Supercritical Polymerization Conditions, http://www.chemistry.unina.it/jlpo/bluesky/first_bluesky/list_of_posters.htm pp. 1-10, 2002.

Linnolahti et al., theoretical Study on the Factors Controlling the Accessibility of Cationic Metal Centers in Zirconocene Polymerization Catalysts, Macromolecules, 2000, vol. 33, pp. 9205-9214.

Lofgren et al., Metallocene-PP Produced Under Supercritical Conditions, 1st Blue Sky Conference on Catalytic Olefin Polymerization, Jun. 17-20, 2002, Sorrento, Italy, 2002.

Luft, Development of Metallocene Catalysts and Their Application in the High Pressure Polymerisation Process, Darmstadt University of Technology, PE 1999, World Congress Global Technology Update Forum, Mar. 15-16, 1999, Zurich, Switzerland.

Ogasawara et al., Metathesis Route to Bridged Metallocenes, J. Am. Chem. Soc., 2002, vol. 124, pp. 9068-9069.

Piccolrovazzi et al., Electronic Effects in Homogeneous Indenylzirconium Ziegler-Natta Catalysts, Organometallics, 1990, vol. 9, No. 12, pp. 3098-3105.

Plenio, et al., Aminozirconocenes: A New class of Zirconocenese with a Nitrogen Atom Directly Bonded to an $\eta^5$-cyclopentadienyl (indenyl) ligand, J. Organometallic Chem., 1996, vol. 519, pp. 269-272.

Rausch et al., The Formation of Ring-substituted Titanocene Derivatives Containing Chloro and Carbomethoxy Substituents, Journal of Organometallic Chemistry, Elsevier-Sequoia S.A. Lausanne, CH, Dec. 20, 1988, vol. 358, No. 103, pp. 161-168.

Resconi et al., Selectivity in Propene Polymerization with Metallocene Catalysts, Chem. Rev. 2000, vol. 100, pp. 1253-1345.

Resconi et al., Highly Regiospecific Zirconocene Catalysts for the Isospecific Polymerization of Propene, J. Amer. Chem. Soc., 1998, 120, pp. 2308-2321.

Resconi et al., rac-[Methylene(3-tert-butyl-1-indenyl)$_2$]ZrCl$_2$: A Simple, High-Performance Zirconocene Catalyst for Isotactic Polypropene, Organometallics, 2000, 19, pp. 420-429.

Rheingold et al., Preparation and Properties of Chiral Titanocene and Zirconocene Dichloride Complexes of a Chiral Ligand, Organometallics, 1992, vol. 11, pp. 1869-1876.

Ryabov et al., Zirconium Complexes with Cyclopentadienyl Ligands Involving Fused a thiophene Fragment, Organometallics, 2002, vol. 21, pp. 2842-2855.

Schäfer et al., ansa-Metallocene Derivatives, XII. Diastereomeric Derivatisation and Enantiomer Separation of Ethylenebis(Tetrahydroindenyl)-Titanium and -Zirconium Dichlorides, Journal of Organometallic Chemistry, 1987, vol. 328, No. 1-2, pp. 87-99.

Schaverien et al., Ethylene Bis(2-Indenyl) Zirconocene: A New Class of Diastereomeric Metallocenes for the (Co) Polymerization of Alpha-Olefins, Organometallics, vol. 20, No. 16, 2001, pp. 3436-3452.

Schmid et al., Unbridged Cyclopentadienyl-fluorenyl Complexes of Zirconium as Catalysts for Homogeneous Olefin Polymerization, Journal of Organometallic Chemistry, 1995, vol. 501, No. 1-2, pp. 101-106.

Scollard et al., Polymerization of $\alpha$-Olefins by Chelating Diamid Complexes of Titanium, Macromolecules, 1996, vol. 29, pp. 5241-5243.

Siedle et al., Synthesis of Unsymmetrical Ansa-Fluorenyl Metallocenes, Journal of Molecular Catalysis, 2004, vol. 214, No. 2, pp. 187-198.

Smith et al., Thermodynamic Data for Pure Compounds Part A, Hydrocarbons and Ketones Physical Sciences Data, vol. 25, Elsevier, New York, 1986, pp. 308-309.

Spalek et al., The Influence of Aromatic Substituents on the Polymerization Behavior of Bridged Zirconocene Catalysts, Organometallics, 1994, 13, pp. 954-963.

Stephenson et al., Handbook of the Thermodynamics of Organic Compounds, Elsevier Science Publ. NY, p. 75.

Stratton, Waxes, in Encyclo. Polymer Science and Eng., vol. 17, pp. 784-795, 2nd Edition.

Suzuki et al., Olefin Polymerization Using Highly Congested ansa-Metallocene under High Pressure: Formation of Superhigh Molecular Weight Polyolefins, Macromolecules, 2000, vol. 33, pp. 754-759.

Yamasaki et al., Novel High performance ansa-Zirconocene Catalysts for Isospecific Polymerization of Propylene, Chem. Letters, 1999, pp. 1311-1312.

Yano et al., Homo- and Copolymerization of Ethylene at High Temperature with Cationic Zirconocene Catalysts, Macromol. Chem. Phys. 200, No. 4, pp. 917-923 (Wiley-VCH Verlag GmbH, 1999).

Yano et al., Homo- and Copolymerization of Ethylene at by Cationic Hafnocene Catalysts based on Tetrakis(pentafluorophenyl), Macromol. Chem. Phys. 200, No. 4, 1999, pp. 924-932 (Wiley-VCH Verlag GmbH).

Yano et al., Novel Zirconocene Catalysts for the Production of High Molecular Weight LLDPE in High Temperature Polymerization, Macromol. Chem. Phys. 200, No. 4, 1999, pp. 933-941 (Wiley-VCH Verlag GmbH).

Yano et al., Ethylene/1-Hexene Copolymerization with Ph$_2$C(Cp)(Flu)ZrCl$_2$ Derivatives: Correlation Between Ligand Structure and Copolymerization Behavior at High Temperature, Macromolecular Chemistry and Physics, 1999, vol. 200, No. 6, pp. 1542-1553.

Waldbaum et al., Novel Organoiron Compounds Resulting From the Attempted Syntheses of Dibenzofulvalene Complexes, Inorganica Chimica Acta, 1999, vol. 291, No. 1-2, pp. 109-126.

Walther et al., Metallocene-Catalyzed Polymerisation in Supercritical Propylene, Sep. 22-25, 2002, Venice, Italy, High Pressure in Venice, 4th International Symposium on High Pressure Process Technology and Chemical Engineering.

Wild et al., ansa-Metallocene Derivatives, IV, Synthesis and Molecular Structures of Chiral ansa-Titanocene Derivatives with Bridged Tetrahydroindenyl Ligands, Journal of Organometallic Chemistry, 1982, vol. 232, pp. 233-247.

* cited by examiner

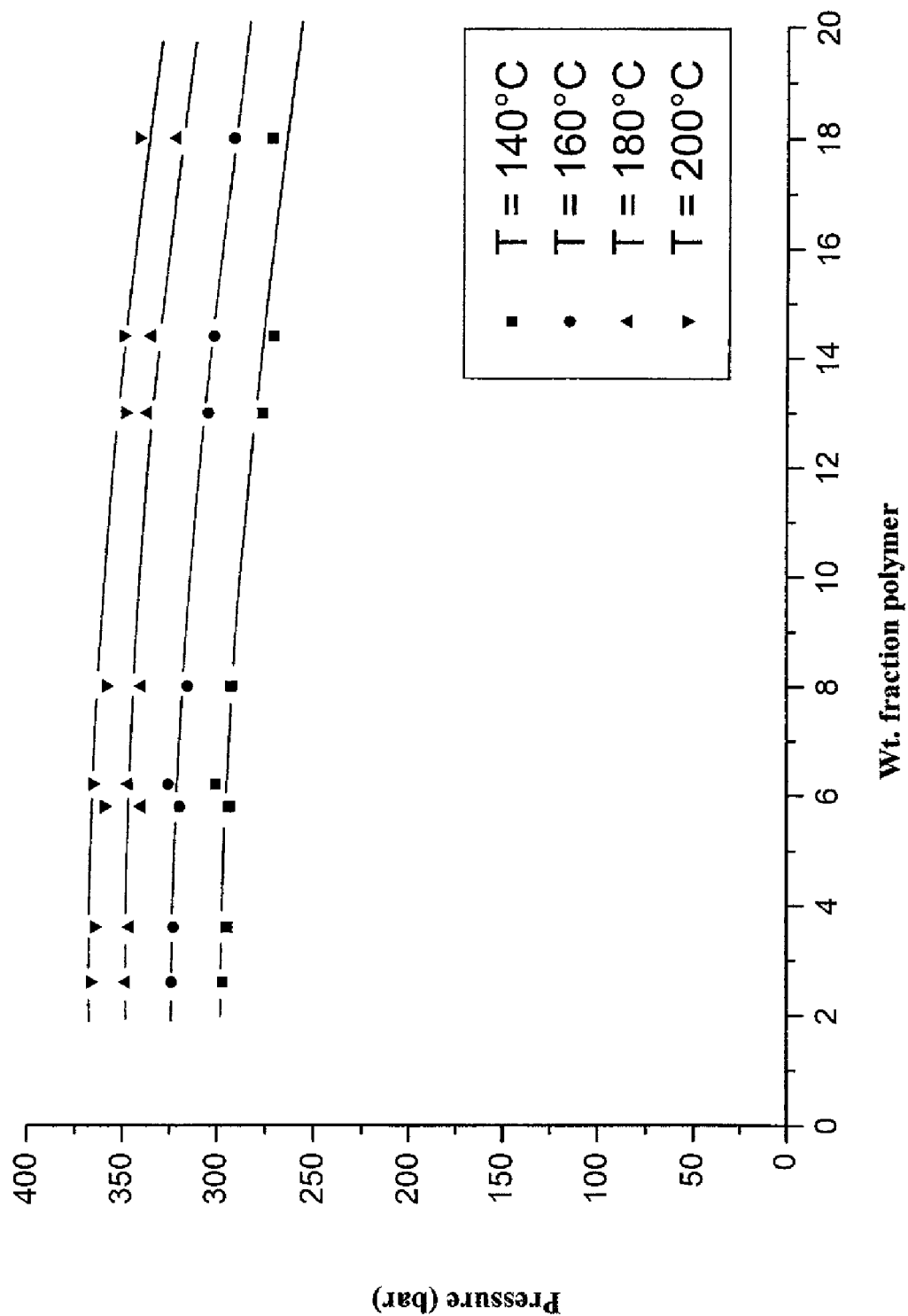
Fig. 2 Cloud point isotherms, Polymer Achieve 1635

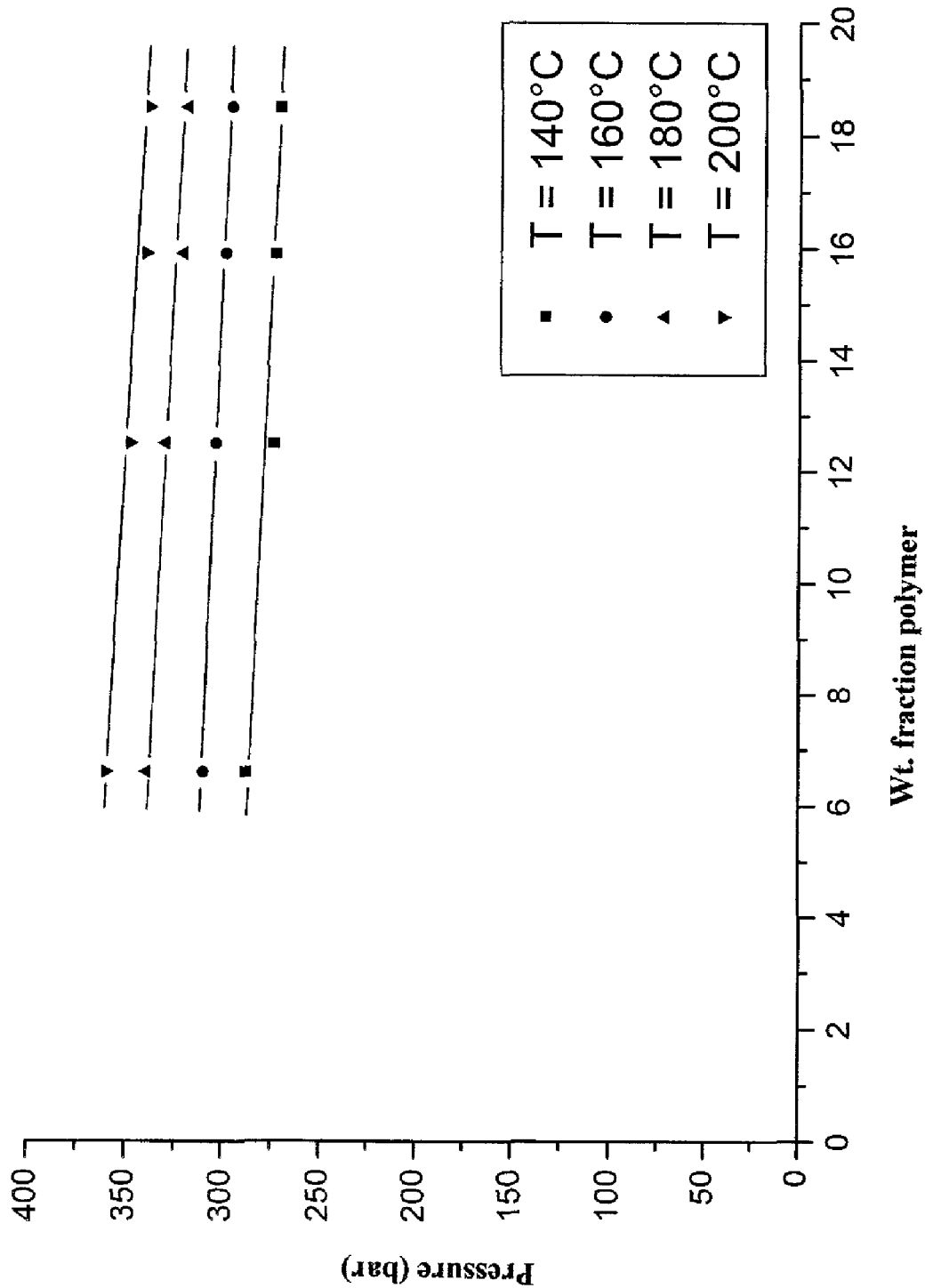
Fig. 3 Cloud point isotherms, Polymer PP 45379

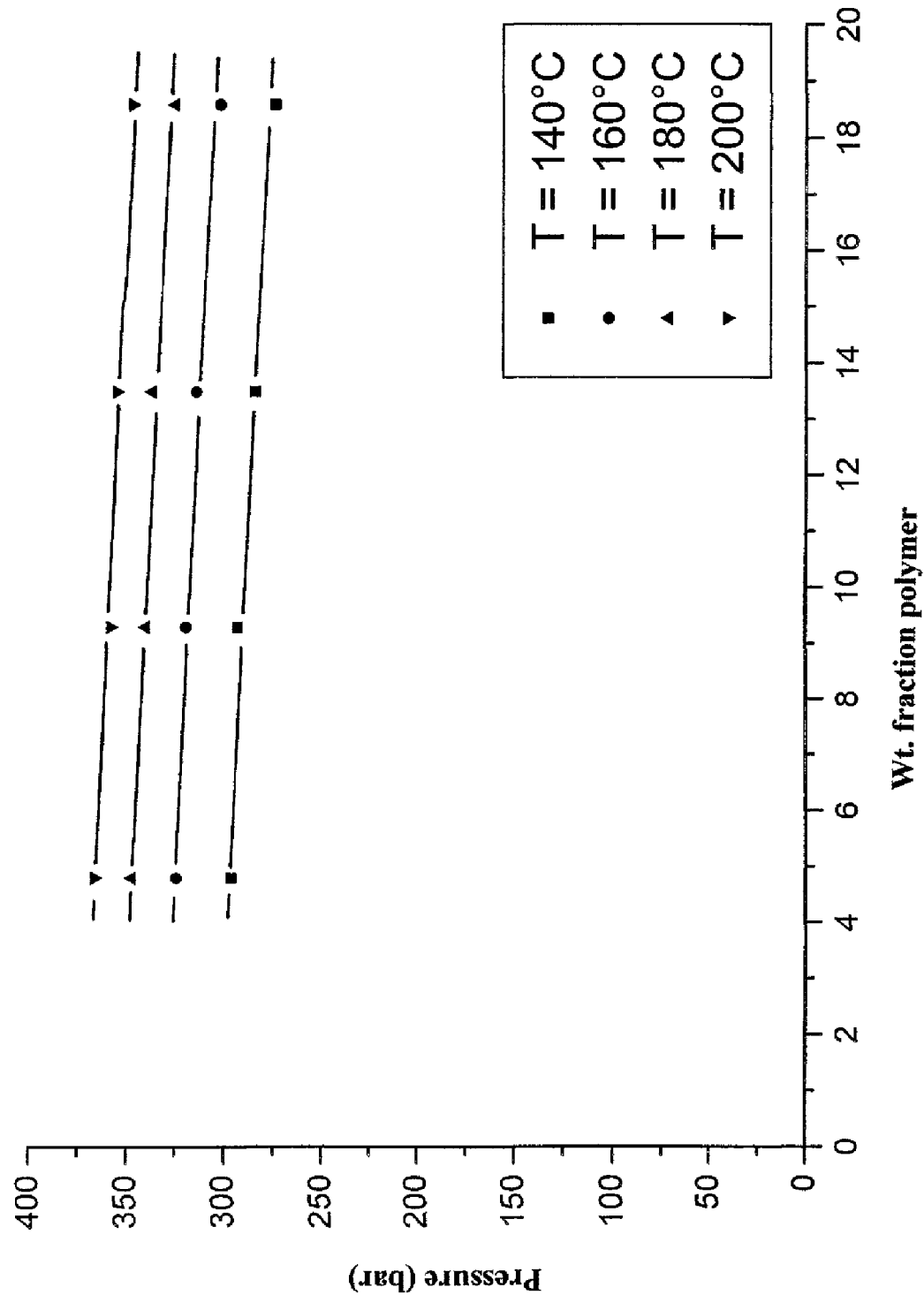
Fig. 4 Cloud point isotherms, Polymer PP 4062

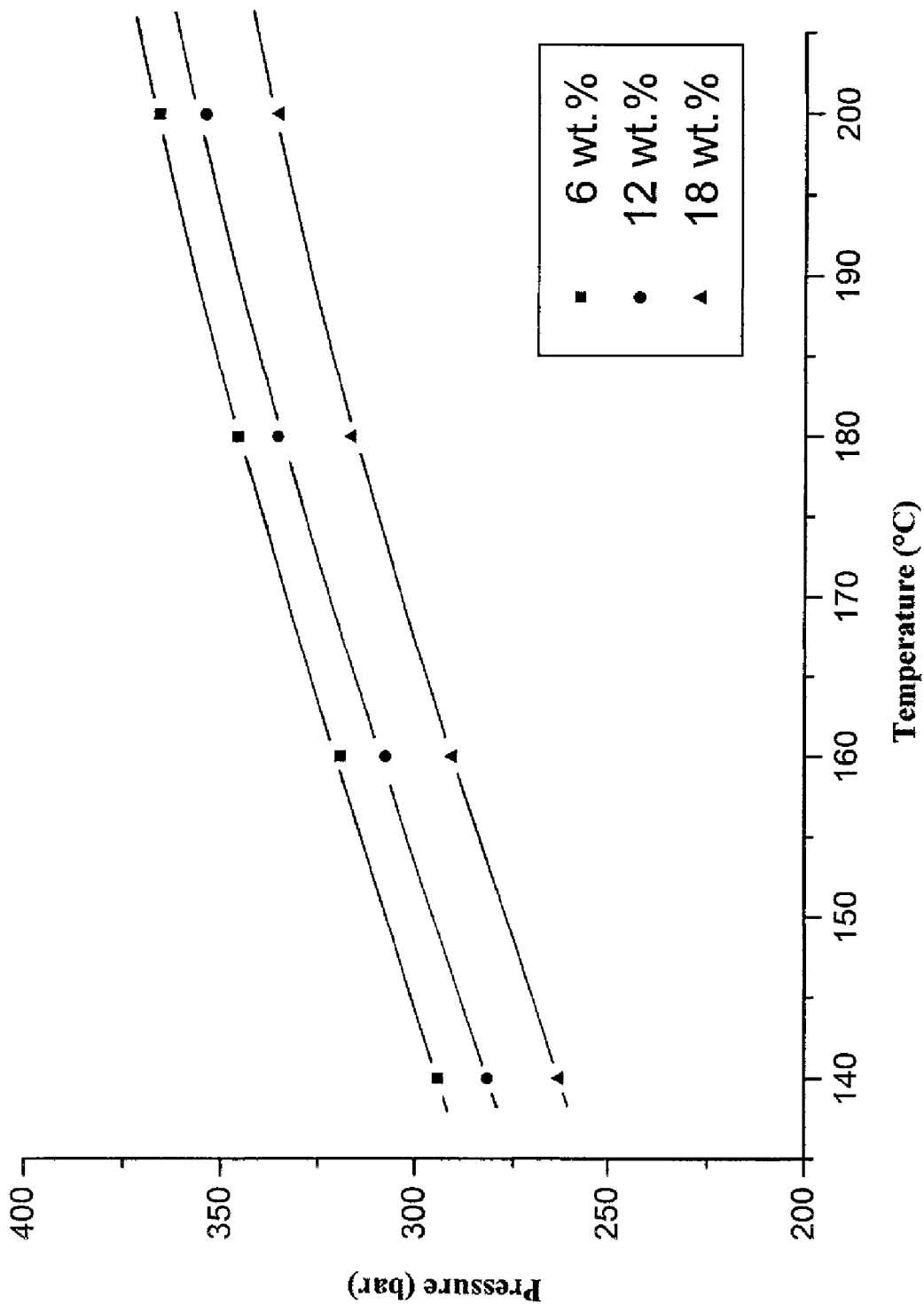
Fig. 5 Cloud point isopleths, Polymer Achieve 1635

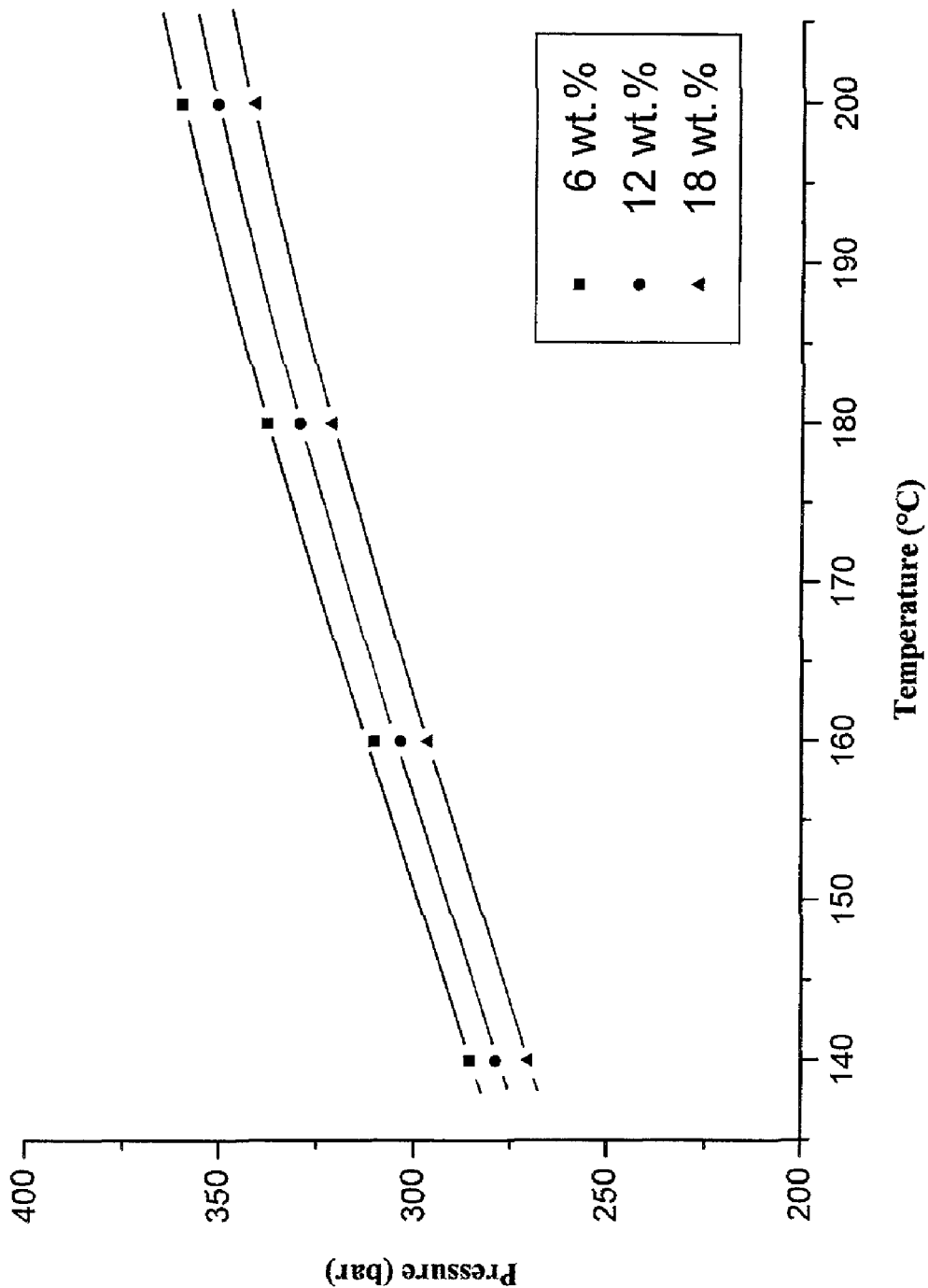
Fig. 6 Cloud point isopleths, Polymer PP 45379

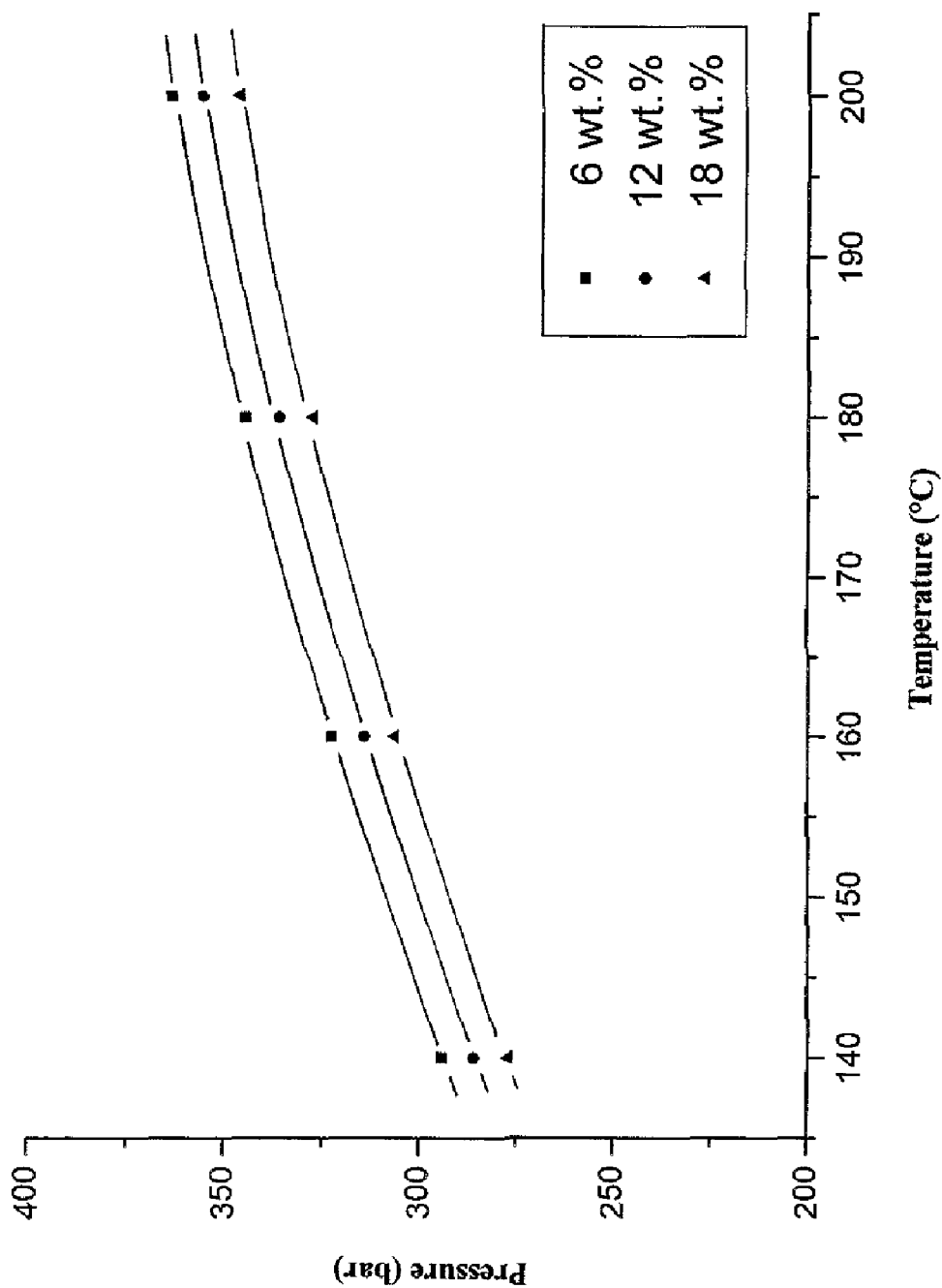
Fig. 7 Cloud point isopleths, Polymer PP 4062

SUPER-SOLUTION HOMOGENEOUS PROPYLENE POLYMERIZATION

PRIORITY CLAIM

This application claims the benefit of and priority to U.S. Ser. No. 60/933,007, filed Jun. 4, 2007. This application is also a continuation-in-part of application having U.S. Ser. No. 10/667,585, filed on Sep. 22, 2003, (now U.S. Pat. No. 7,354,979), which claims priority to U.S. Ser. No. 60/412,541, filed Sep. 20, 2002.

BACKGROUND OF THE INVENTION

1. Field of the Invention

Embodiments of the present invention generally relate to polymerization of olefin monomers having three or more carbon atoms at super-solution conditions.

2. Description of the Related Art

Since the mid-1980s metallocene catalysts have been used in high-pressure reactors-mainly for producing ethylene-backbone polymers including ethylene copolymers with monomers of one or more of propylene, butene, and hexene, along with other specialty monomers such as 4-methyl-1,5-hexadiene. For example U.S. Pat. No. 5,756,608, granted to Langhausen et al., reports a process for polymerizing C2 to C10 1-alkenes using bridged metallocene catalysts. Polypropylene production in homogeneous high pressure conditions has, however, been seen as impractical and unworkable at temperatures much above the propylene critical point. A process to produce commercially useful polypropylene in a high pressure system would provide advantages, such as increased reactivity, or increased catalyst productivity, or higher throughput, or shorter residence times, etc. Likewise new polypropylene polymers are also in constant need for the preparation of new and improved products. Thus there is a need in the art to develop new processes capable of greater efficiency and manufacture of new polypropylene polymers.

U.S. Pat. No. 6,084,041, granted to Andtsjö et al., discloses supercritical propylene polymerization under relatively mild conditions (90-100° C. and less than 6.89 MPa pressure) using supported Ziegler-Natta and metallocene catalysts. This patent does not relate to propylene copolymerization at temperatures or pressures much higher than described above. It also does not specifically disclose bulk propylene polymerization using soluble, unsupported metallocene catalysts.

U.S. Pat. No. 5,969,062 granted to Mole et al., describes a process for preparing ethylene copolymers with α-olefins in which polymerization is carried out at a pressure between 100-350 MPa and at a temperature from 200-280° C. The catalyst is based on a tetramethylcyclopentadienyl titanium complex.

U.S. Pat. No. 5,408,017 describes an olefin polymerization catalyst for use at polymerization temperatures of 140° C.-160° C., or greater. Mainly, temperatures exceeding the melting point temperature and approaching the polymer decomposition temperature are said to yield high productivity.

WO 93/11171 discloses a polyolefin production process that comprises continuously feeding olefin monomer and a metallocene catalyst system into a reactor. The monomer is continuously polymerized to provide a monomer-polymer mixture. Polymerization conditions keep this mixture at a pressure below the system's cloud-point pressure. These conditions create a polymer-rich and a monomer-rich phase and maintain the mixture's temperature above the polymer's melting point.

U.S. Pat. No. 6,355,741 discloses a process for producing polyolefins having a bimodal molecular weight distribution. The process comprises producing a first polyolefin fraction in a first loop reactor. The process couples this first loop reactor to a second loop reactor that prepares a second polyolefin fraction. At least one of the loops uses supercritical conditions.

WO 92/14766 describes a process comprising the steps of (a) continuously feeding olefinic monomer and a catalyst system, with a metallocene component and a cocatalyst component, to the reactor; (b) continuously polymerizing that monomer in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the reactor.

U.S. Pat. No. 5,326,835 describes bimodal polyethylene production. This invention's first reactor stage is a loop reactor in which polymerization occurs in an inert, low-boiling hydrocarbon. After the loop reactor, the polymerization system transits into a gas-phase reactor where gas-phase ethylene polymerization occurs. The polymer produced appears to have a bimodal molecular weight distribution.

CA 2,118,711 (equivalent to DE 4,130,299) describes propylene polymerization at 149° C. and 1510 bar using $(CH_3)_2$C(fluorenyl)(cyclopentadienyl)zirconium dichloride complex, methylalumoxane and trimethylaluminum. Catalyst activity is reported to be 8,380 gPP/gIc' hr. The Mw is reported to be 2,000. CA 2,118,711 also describes propylene polymerization with ethylene at 190° C. and 1508 bar using $(CH_3)_2$C(fluorenyl)(cyclopentadienyl)zirconium dichloride complex, methylalumoxane and trimethylaluminum. Catalyst activity is reported to be 24,358 g polymer/gIc' hr. The Mw is reported to be 10,000.

Other references of interest include:

Olefin Polymerization Using Highly Congested ansa-Metallocenes under High Pressure: Formation of Superhigh Molecular Weight Polyolefins, Suzuki, et al., Macromolecules, 2000, 33, 754-759, EP 1 123 226, WO 00 12572, WO 00 37514, EP 1 195 391, U.S. Pat. No. 6,355,741, and Ethylene Bis(Indenyl) Zirconocenes, Schaverien, C. J. et al., Organometallics, ACS, Columbus Ohio, Vol. 20, no. 16, August 2001, pages 3436-3452, WO 96/34023, WO 97/11098, U.S. Pat. No. 5,084,534, U.S. Pat. No. 2,852,501, WO 93/05082, EP 129 368 B1, WO 97/45434, JP 96-208535 199660807, U.S. Pat. No. 5,096,867, WO 96/12744, U.S. Pat. No. 5,408,017, U.S. Pat. No. 5,084,534, U.S. Pat. No. 6,225,432, WO 02/090399, EP 1 195 391, WO 02/50145, US 2002/013440, WO 01/46273, EP 1 008 607, JP-1998-110003A, U.S. Pat. No. 6,562,914, and JP-1998-341202B2.

Another item of interest is an abstract obtained from the Borealis website that states:

Barbo Loefgren, E. Kokko, L. Huhtanen, M Lahelin, Petri Lehmus, Udo Stehling. "Metallocene-PP produced under supercritical conditions." 1st Bluesky Conference on Catalytic Olefin Polymerization, 17.-20.6.2002, Sorrento, Italy., ( ), 2002. "mPP produced in bulk conditions (100% propylene), especially at elevated temperature and under supercritical conditions, shows rheological behaviour indicative for small amounts of LCB in the polymer. This is a feature that can be utilized to produce mPP with enhanced melt strength under industrially meaningful conditions."

SUMMARY OF THE INVENTION

Processes for polymerizing propylene are provided. In at least one specific embodiment, about 40 wt % to about 80 wt % propylene monomer, based on total weight of propylene monomer and diluent, and about 20 wt % to about 60 wt % diluent, based on total weight of propylene monomer and diluent, can be fed into a reactor. The propylene monomer can be polymerized in the presence of a metallocene catalyst and an activator within the reactor at a temperature of about 80° C. or more and a pressure of about 13 MPa or more to produce a polymer product in a homogenous system. About 20 wt % to about 76 wt % (preferably about 28 to about 76 wt %) propylene monomer, based on total weight of the propylene monomer, diluent, and polymer product, can be present in the reactor at steady state conditions. ("at steady state conditions" is meant to include the end of a batch run for batch polymerizations.)

BRIEF DESCRIPTION OF THE DRAWINGS

FIG. 2 depicts cloud point isotherms for Polymer Achieve™ 1635.

FIG. 3 depicts cloud point isotherms for Polymer PP 45379 dissolved in bulk propylene.

FIG. 4 depicts cloud point isotherms for Polymer PP 4062 dissolved in bulk propylene.

FIG. 5 depicts cloud point isopleths for Polymer Achieve™ 1635 dissolved in bulk propylene.

FIG. 6 depicts cloud point isopleths for Polymer PP 45379 dissolved in bulk propylene.

FIG. 7 depicts cloud point isopleths for Polymer PP 4062 dissolved in bulk propylene.

DEFINITIONS

Figure 1:
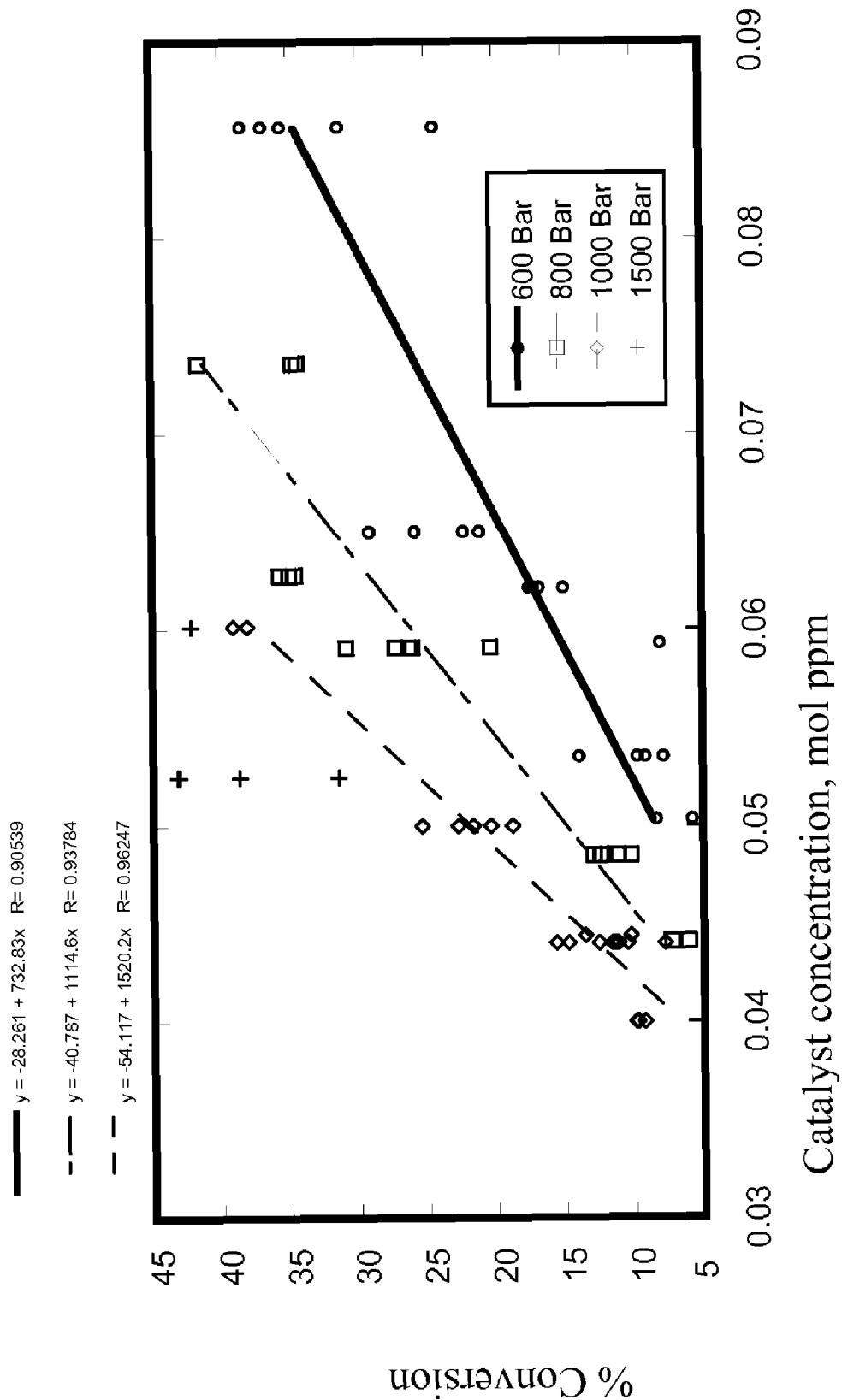
FIG. 1 depicts a graphical representation of percent concentration versus catalyst concentration, which shows that conversion increases with increasing catalyst concentration and with increasing pressure.

For purposes of this invention and the claims thereto.

A catalyst system is defined to be the combination of a catalyst precursor compound and an activator.

Fluids are defined as fluids in their liquid or supercritical states with densities greater than 300 kg/m$^3$.

The polymerization system can form one single fluid phase or two fluid phases.

Solid-fluid phase transition temperature is defined as the temperature at which a solid polymer phase separates from the polymer-containing polymerization system at a given pressure. The solid-fluid phase transition temperature can be determined by temperature reduction at constant pressure starting from temperatures at which the polymer is fully dissolved in the polymerization system. Solid-fluid phase transition temperature can be measured by turbidity in addition to other known measurement techniques.

Solid-fluid phase transition pressure is defined as the pressure at which a solid polymer phase separates from the polymer-containing polymerization system at a given temperature. The solid-fluid phase transition pressure can be determined by pressure reduction at constant temperature starting from pressures at which the polymer is fully dissolved in the polymerization system. Solid-fluid phase transition pressure can be measured by turbidity in addition to other known measurement techniques.

The cloud point is the pressure below which, at a given temperature, the polymer-containing polymerization system becomes turbid as described in J. Vladimir Oliveira, C. Dariva and J. C. Pinto, Ind. Eng, Chem. Res. 29, 2000, 4627. The cloud point can be measured by shining a helium laser through the selected polymerization system in a cloud point cell onto a photocell and recording the pressure at the onset of light scattering (turbidity) for a given temperature.

Use of the term "polymerization" encompasses any polymerization reaction such as homopolymerization and copolymerization. Copolymerization encompasses any polymerization reaction of two or more monomers.

The new numbering scheme for the Periodic Table Groups is used as published in Chemical and Engineering News, 63 (5), 27 (1985).

When a polymer is referred to as comprising an olefin, the olefin present in the polymer is the polymerized form of the olefin.

An oligomer is defined to be compositions having 2-75 mer units.

A polymer is defined to be compositions having 76 or more mer units.

A series reactor cascade can include two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams. In a parallel reactor configuration, the reactor or reactors in series cascade that form a branch of the parallel reactor configuration is referred to as a reactor train.

For purposes of this invention and the claims thereto, the term "polymerization system" is defined to be monomer(s) plus optional comonomer(s) plus polymer product plus solvent(s)/diluent(s) plus optional scavenger(s). None of the parts of the catalyst system are considered to be part of the polymerization system.

For purposes of this invention and the claims thereto, the critical temperatures (Tc) and critical pressures (Pc) are those found in the Handbook of Chemistry and Physics, David R. Lide, Editor-in-Chief, 82nd edition 2001-2002, CRC Press, LLC. New York, 2001. In particular, the Tc and Pc of various molecules are:

| Name | Tc (K) | Pc (MPa) |
| --- | --- | --- |
| Hexane | 507.6 | 3.025 |
| Isobutane | 407.8 | 3.64 |
| Ethane | 305.3 | 4.872 |
| Cyclobutane | 460.0 | 4.98 |
| Cyclopentane | 511.7 | 4.51 |
| 1-butene | 419.5 | 4.02 |
| 1-pentene | 464.8 | 3.56 |
| Pentane | 469.7 | 3.37 |
| Benzene | 562.05 | 4.895 |
| 1-hexene | 504.0 | 3.21 |
| Propane | 369.8 | 4.248 |
| Toluene | 591.8 | 4.11 |
| Methane | 190.56 | 4.599 |
| Butane | 425.12 | 3.796 |
| Ethylene | 282.34 | 5.041 |
| Propylene | 364.9 | 4.6 |
| Cyclopentene | 506.5 | 4.8 |
| Isopentane | 460.4 | 3.38 |
| Cyclohexane | 553.8 | 4.08 |
| Heptane | 540.2 | 2.74 |

273.2 K = 0° C.

By "continuous" it is meant a system that operates (or is intended to operate) without interruption or cessation. For example a continuous process to produce a polymer would be one where the reactants are continually introduced into one or more reactors and polymer product is continually withdrawn.

The term "high boiling point diluent" refers to a hydrocarbon having a boiling point of 30° C. or more, or 50° C. or more, or 70° C. or more, 100° C. or more, 120° C. or more, or 150° C. or more than the boiling point of propylene (−47.6° C., at 760 mmHg).

DETAILED DESCRIPTION OF THE INVENTION

A process for polymerizing olefin monomers in a homogeneous system is provided. In one or more embodiments, the process includes contacting, in a polymerization system, one or more monomers (preferably propylene) with a catalyst, an activator, optionally comonomer (preferably ethylene, butene, hexene or octene), and optionally diluent or solvent, at a temperature above 80° C. and at a pressure above 13 MPa. The polymerization takes place in a homogeneous system within the reactor.

In one or more embodiments, about 40 wt % to about 80 wt % propylene monomer, based on total weight of propylene monomer and diluent, and about 20 wt % to about 60 wt % diluent, based on total weight of propylene monomer and diluent, is fed into a reactor. The propylene monomer is polymerized in the presence of a metallocene catalyst and an activator within the reactor at a temperature of about 80° C. or more and a pressure of about 13 MPa or more to produce a polymer product in a homogenous system. Preferably, about 20 wt % to about 76 wt % (preferably about 28 wt % to about 76 wt %) propylene monomer, based on total weight of the propylene monomer, diluent, and polymer product, is present in the reactor at steady state conditions. In one or more embodiments above or elsewhere herein, the monomer feed to the process can include one or more monomers and one or more diluents. In one or more embodiments above or elsewhere herein, the monomer feed to the process can include monomer, comonomer, and one or more diluents. Scavengers and co-catalyst can also be included in the monomer feed.

In one or more embodiments, the monomer feed can contain monomer ranging from a low of about 40 wt %, 45 wt %, or 50 wt % to a high of about 70 wt %, 75 wt % or 80 wt %, based on total weight of monomer and diluent. In one or more embodiments, the monomer feed can contain monomer ranging from about 40 wt % to about 75 wt %, based on total weight of monomer and diluent. In one or more embodiments, the monomer feed can contain monomer ranging from about 40 wt % to about 70 wt %, based on total weight of monomer and diluent. In one or more embodiments, the monomer feed can contain monomer ranging from about 40 wt % to about 60 wt %, based on total weight of monomer and diluent. In one or more embodiments, the monomer feed contain about 20 wt %, 15 wt % or less one or more comonomers, based on total weight of propylene monomer, comonomer and diluent.

In one or more embodiments, the polymerization system contains of from 40 wt % to 80 wt % monomer. In one or more embodiments, the polymerization system contains of from 40 wt % to 75 wt % monomer. In one or more embodiments, the polymerization system contains of from 50 wt % to 75 wt % monomer. In one or more embodiments, the polymerization system contains of from 40 wt % to 70 wt % monomer. In one or more embodiments, the monomer content of the polymerization system can range from a low of about 40 wt %, 45 wt %, or 50 wt % to a high of about 70 wt %, 75 wt % or 80 wt %.

In one or more embodiments, the polymerization system contains of from 30 wt % to 80 wt % of the diluent or solvent. In one or more embodiments, the polymerization system contains greater than 35 wt % and less than 75 wt % diluent or solvent. In one or more embodiments, the polymerization system contains of from 40 wt % to 75 wt % diluent or solvent. In one or more embodiments, the diluent or solvent content of the polymerization system can range from a low of about 40 wt %, 45 wt %, or 50 wt % to a high of about 65 wt %, 70 wt % or 75 wt %. Preferably, the diluent or solvent is or includes hexane. In one or more embodiments, the monomer feed can contain diluent ranging from a low of about 20 wt %, 30 wt %, or 40 wt % to a high of about 50 wt %, 55 wt % or 60 wt %, based on total weight of monomer and diluent. In one or more embodiments, the monomer feed can contain diluent ranging from about 20 wt % to about 60 wt %, based on total weight of monomer and diluent. In one or more embodiments, the monomer feed can contain diluent ranging from about 30 wt % to about 55 wt %, based on total weight of monomer and diluent. In one or more embodiments, the monomer feed can contain diluent ranging from about 30 wt % to about 50 wt %, based on total weight of monomer and diluent. Not wishing to be bound by theory, it is believed that the high concentration of diluent or solvent can improve the solubility of highly crystalline iPP and depress the cloud point of the polymerization system. It is also believed that the diluent or solvent can depress the reaction pressure required to produce crystallizable propylene-based polymer products, including highly crystalline isotactic polypropylene and syndiotactic polypropylene, significantly lowering construction and operating costs.

In one or more embodiments, the density of the polymerization system is about 0.3 g/cc or more. In one or more embodiments, the density of the polymerization system is about 0.4 g/cc or more. In one or more embodiments, the density of the polymerization system is about 0.5 g/cc or more. In one or more embodiments, the density of the polymerization system is about 0.6 g/cc or more. In one or more embodiments, the density of the polymerization system is of from 0.51 g/cc to 0.75 g/cc.

In one or more embodiments, the steady state polymer yield (i.e conversion of propylene monomer to polymer product) is at least 5 wt % of the propylene monomer (alternately at least 10 wt %, alternately at least 20 wt %, alternately at least 30 wt %, alternately at least 40 wt %, alternately at least 50 wt %, alternately at least 60 wt %, alternately at least 70 wt %, alternately at least 80 wt %, alternately at least 90 wt % of the propylene monomer). In another embodiment, the conversion of the propylene monomer to polymer product is about 5 wt % to about 45 wt % of the propylene monomer (preferably from about 5 wt % to about 35 wt %, preferably 15 wt % to about 35 wt %).

In one or more embodiments, the polymerization conditions are sufficient to maintain the polymerization system in a single, homogeneous fluid state. For example, the reaction temperature and pressure can be selected so that the polymer produced, and the polymerization system that solvates it, remain single phased, i.e., above the polymerization system's cloud point with that polymer. The upper limit for temperature can be determined by the product properties that are strongly influenced by the reaction temperature (for an example, see FIG. 1). Since often polymers with higher molecular weights and/or higher melting points are desired, high polymerization temperatures (>200° C.) are generally not advantageous. Increased temperatures can also degrade many known catalytic systems, providing another reason for avoiding excessive polymerization temperatures. FIG. 2 provides an example of how catalytic activity is impacted by increasing polymerization temperature. Temperatures below 250° C. are preferred.

The lower limits of reaction temperature can be determined by the desired polymer properties. Lower temperatures generally favor higher crystallinity and higher molecular weight (see FIG. 1). For homogeneous polymerization processes, the lower limits of reaction temperature can also be determined by the solid-fluid phase transition temperature. Reactors operated below the solid-fluid phase transition temperature of the reaction mixture can lead to operation problems due to fouling. For the production of highly crystalline polypropylenes (melting peak temperatures >150° C.) in homogeneous polymerization processes, the minimum operating temperature is about 95-100° C. In the production of lower melting copolymers, such as ethylene-propylene and ethylene-hexene-1 copolymers, significantly lower reactor temperatures, e.g., 90° C. or even lower, can be used without fouling. The application of certain inert solvents can further reduce the minimum operation temperature of the fouling-free operation regime, although, as discussed earlier, the substantial presence of inert solvents can reduce polymerization rate, product molecular weight, and can depress the melting peak temperature.

In one or more embodiments, the polymerization conditions are sufficient to dissolve the polymer product in the monomer(s) present in the liquid state (i.e "bulk solution polymerization"). In one or more embodiments, the critical temperature and pressure of reactor blends are different from the critical values of pure components, and thus supercritical operations at temperatures lower than the critical temperature of pure monomers (e.g., 92° C. for propylene) are possible. In one or more embodiments, near-amorphous materials with low melting points as well as amorphous materials can be produced without fouling even below the critical temperature of the reactor blends, i.e., at temperatures that correspond to the condensed liquid state of the polymerization system in the reactor. In these instances, the operating temperature can be below the bubble point of the reaction mixture and thus the reactor can operate at what is often referred to as liquid-filled conditions. In some instances, such operation mode could be desired to achieve high molecular weight (MW) and thus low melt flow rate (MFR), particularly in the manufacture of copolymers, such as propylene-ethylene or ethylene-higher olefin copolymers.

In one or more embodiments, the reaction temperature and pressure can be selected so that the polymerization system remains at a pressure below the polymer's cloud point in the particular polymerization system, resulting in a two-phase polymerization system: a polymer rich phase and a polymer lean phase. Some embodiments that are below the polymer's cloud point nonetheless operate above the polymer's crystallization temperature. The terms "two-phase system" or "two-phase polymerization system" refer to a polymerization system having two and, preferably, only two phases. In certain embodiments, the two phases are referenced as a "first phase" and a "second phase." In certain embodiments, the first phase is or includes a "monomer phase," which includes monomer(s) and can also include diluent and some or all the product of polymerization. In certain embodiments, the second phase is or includes a solid phase, which can include products of polymerization, e.g., macromers and polymer product, but not monomers, e.g., propylene.

In one or more embodiments, the polymerization temperature is above the cloud point of the single-phase polymerization system at the reactor pressure. More preferably, the temperature is 2° C. or more above the cloud point of the polymerization system at the reactor pressure. In another embodiment, the temperature is between 50 and 250° C., between 60 and 200° C., between 70 and 180° C., or between 80 and 150° C. In another embodiment, the temperature is above 50, 60, 70, 80, 90, 95, 100, 110, or 120° C. In another embodiment, the temperature is below 250, 200, 190, 180, 170, 160, or 150° C. In one or more embodiments, the polymerization temperature is about 60° C. to about 190° C. In one or more embodiments, the polymerization temperature is about 60° C. to about 160° C. In one or more embodiments, the polymerization temperature is about 80° C. to about 140° C. In one or more embodiments, the polymerization temperature is about 80° C. to about 130° C. In one or more embodiments, the polymerization temperature is about 80° C. to about 105° C. In one or more embodiments, the polymerization temperature is about 80° C. to about 95° C. In one or more embodiments, the polymerization temperature is about 60° C. to about 65° C.

In one or more embodiments, the polymerization temperature can be above the solid-fluid phase transition temperature of the polymerization system at the reactor pressure. Preferably, the temperature is at least 5° C. above the solid-fluid phase transition temperature of the polymerization system at the reactor pressure. More preferably, the temperature is at least 10° C. above the solid-fluid phase transformation point of the polymerization system at the reactor pressure.

In one or more embodiments, the polymerization pressure is no lower than the fluid-fluid phase transition pressure of the polymerization system at the reactor temperature. In one or more embodiments, the polymerization pressure is no lower than 2 MPa below the cloud point of the polymerization system at the reactor temperature. In one or more embodiments, the pressure is between 13.8 MPa and 300 MPa, between 20 and 200 MPa, or between 20 and 150 MPa. In one or more embodiments, the pressure is above 10, 15 20, 30, or 40 MPa. In one or more embodiments, the pressure is below 500, 300, 250, 200, 100, or 50 MPa. In one or more embodiments, the pressure is between 10 and 200 MPa, between 10 and 100 MPa, or between 10 and 50 MPa, or between 10 and 40 MPa, or between 10 and 30 MPa, or between 10 and 20 MPa, or between 10 and 15 MPa, or between 10 and 14 MPa, or between 10 and 13 MPa, or between 10 and 12 MPa, or between 10 and 11 MPa. In one or more embodiments, the pressure is about 13 MPa or more. In one or more embodiments, the pressure is about 13 MPa to about 42 MPa. In one or more embodiments, the pressure is about 13 MPa to about 35 MPa. about In one or more embodiments, the pressure is about 13 MPa to about 28 MPa. In one or more embodiments, the pressure is about 13 MPa to about 20 MPa. In one or more embodiments, the pressure is about 13.8 MPa.

Monomers

Any monomer having one or more (non-conjugated) aliphatic double bond(s) and two or more carbon atoms can be used. Preferred monomers include α-olefins, such as ethylene, propylene, butene-1, hexene-1, octene-1, and decene-1, substituted olefins, such as styrene, paramethylstyrene, vinylcyclohexane, etc., non-conjugated dienes, such as vinylcyclohexene, etc., α,ω-dienes, such as 1,5-hexadiene, 1,7-octadiene, etc., cycloolefins, such as cyclopentene, cyclohexene, cyclohexadiene, etc., norbornene, and the like.

In one or more embodiments, unsaturated monomer or monomers can be used. Preferred monomers include C2 to C100 olefins, preferably C2 to C60 olefins, preferably C3 to C40 olefins preferably C3 to C20 olefins, preferably C3 to C12 olefins. In some embodiments preferred monomers include linear, branched or cyclic alpha-olefins, preferably C3 to C100 alpha-olefins, preferably C3 to C60 alpha-olefins, preferably C3 to C40 alpha-olefins preferably C3 to C20 alpha-olefins, preferably C3 to C12 alpha-olefins. Preferred olefin monomers can be one or more of propylene, butene, pentene, hexene, heptene, octene, nonene, decene, dodecene, 4-methyl-pentene-1,3-methyl pentene-1,3,5,5-trimethyl hexene 1, and 5-ethyl-1-nonene.

In one or more embodiments, aromatic-group-containing monomers containing up to 30 carbon atoms can be used. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to C1 to C10 alkyl groups. Additionally two adjacent substitutions can be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene (I listed this earlier), 4-phenyl-1-butene and allyl benzene.

In one or more embodiments, non-aromatic cyclic group containing monomers can be used. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure can also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantad the like.

In one or more embodiments, diolefin monomer(s) can be used. Preferred diolefin monomers include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymer Product

In a preferred embodiment, the process described can be used to produce homopolymers or copolymers. Preferred polymers produced herein include homopolymers or copolymers of any of the above monomers. In a preferred embodiment, the polymer is a homopolymer of any C3 to C12 alpha-olefin. Preferably, the polymer is a homopolymer of propylene. In another embodiment the polymer is a copolymer comprising propylene and ethylene, preferably the copolymer comprises less than 40 weight % ethylene, more preferably less than 30 weight % ethylene, more preferably less than 20 weight % ethylene, more preferably less than 10 weight % ethylene, and more preferably less than 5 weight % ethylene. In another embodiment, the polymer is a copolymer comprising propylene and one or more of any of the monomers listed above. In another embodiment, the copolymer comprises one or more diolefin comonomers, preferably one or more C6 to C40 non-conjugated diolefins, more preferably C6 to C40 α,ω-dienes.

In another preferred embodiment, the polymer produced herein is a copolymer of propylene and one or more C2 or C4 to C20 linear, branched or cyclic monomers, preferably one or more C2 or C4 to C12 linear, branched or cyclic alpha-olefins. Preferably, the polymer produced herein is a copolymer of propylene and one or more of ethylene, butene, pentene, hexene, heptene, octene, nonene, decene, dodecene, 4-methyl-pentene-1,3-methyl pentene-1, and 3,5,5-trimethyl hexene 1.

In another preferred embodiment, the polymer produced herein can be a copolymer of one or more linear or branched C3 to C30 prochiral alpha-olefins or C5 to C30 ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In a preferred embodiment, the copolymers described herein comprise at least 50 mole % of a first monomer and up to 50 mole % of other monomers.

In another embodiment, the polymer comprises propylene present at from 50 to 98 mole %, preferably 60 to 95 mole %, preferably 70 to 95 mole %, and a comonomer present at from 2 to 50 mole %, preferably 2 to 40 mole %, more preferably 5 to 30 mole %, and a termonomer present at from 0 to 5 mole %, more preferably from 0.5 to 5 mole %, more preferably 1 to 3 mole %.

In one embodiment the first monomer comprises one or more of any C3 to C8 linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 4-methylpentene-1,1-butene, 1-hexene, 1-octene, cyclohexene, cyclooctene, hexadiene, cyclohexadiene and the like.

In one embodiment, the comonomer comprises one or more of any C2 to C40 linear, branched or cyclic alpha-olefins (provided ethylene, if present, is present at 10 mole % or less or preferably 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In one embodiment, the termonomer comprises one or more of any C2 to C40 linear, branched or cyclic alpha-olefins, (provided ethylene, if present, is present at 5 mole % or less), including ethylene, propylene, butene, pentene, hexene, heptene, and octene, nonene, decene, un-decene, do-decene, hexadecene, butadiene, hexadiene, heptadiene, pentadiene, octadiene, nonadiene, decadiene, dodecadiene, styrene, 3,5,5-trimethyl hexene-1,3-methylpentene-1,4-methylpentene-1, cyclopentadiene, and cyclohexene.

In a preferred embodiment, any of the polymers described above further comprise one or more dienes at up to 5 weight %, preferably at 0.00001 to 1.0 weight %, preferably 0.002 to 0.5 weight %, even more preferably 0.003 to 0.2 weight %, based upon the total weight of the composition. In some embodiments 700 wt ppm or less of diene is added to the polymerization feed, preferably 500 wt ppm or less, preferably or 400 wt ppm or less. In other embodiments, at least 100 wt ppm of diene is added to the polymerization, or 150 wt ppm or more, or 200 wt ppm or more.

In another embodiment, the processes described herein are used to produce propylene copolymers with other monomer units, such as ethylene, other α-olefin, α-olefinic diolefin, or non-conjugated diolefin monomers, for example C4-C20 olefins, C4-C20 diolefins, C4-C20 cyclic olefins, C8-C20 styrenic olefins. Other unsaturated monomers besides those specifically described above can be copolymerized using the invention processes, for example, styrene, alkyl-substituted styrene, ethylidene norbornene, norbornadiene, dicyclopentadiene, vinylcyclohexane, vinylcyclohexene, acrylates, and other olefinically-unsaturated monomers, including other cyclic olefins, such as cyclopentene, norbornene, and alkyl-substituted norbornenes. Copolymerization can also incorporate α-olefinic macromonomers produced in-situ or added from another source. Some invention embodiments limit the copolymerization of α-olefinic macromonomers to macromonomers with 2000 or less mer units. U.S. Pat. No. 6,300,451 discloses many useful comonomers. That disclosure refers to comonomers as "a second monomer".

In another embodiment, when propylene copolymers are desired, the following monomers can be copolymerized with propylene: ethylene, but-1-ene, hex-1-ene, 4-methylpent-1-ene, dicyclopentadiene, norbornene, C4-C2000, C4-C200, or C4-C40 linear or branched, α,ω-dienes; C4-C2000, C4-C200, or C4-C40 cyclic olefins; and C4-C2000, C4-C200, or C4-C40 linear or branched α-olefins.

Catalyst Systems

Any polymerization catalyst capable of polymerizing the monomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Illustrative, but not limiting, olefin polymerization catalysts include Ziegler Natta catalyst compounds, metallocene catalyst compounds and other non-metallocene catalyst compounds. Particularly useful metallocene catalyst and non-metallocene catalyst compounds are those disclosed in paragraphs [0081] to [0111] of U.S. Ser. No. 10/667,585, U.S. Pat. No. 7,354,979, and paragraphs [0173] to [0293] of U.S. Ser. No. 11/177,004, now abandoned, the paragraphs of which are fully incorporated herein by reference.

The processes disclosed can employ mixtures of catalyst compounds to select the properties that are desired from the polymer. Mixed catalyst systems can be employed in the in-line blending processes to alter or select desired physical or molecular properties. For example, mixed catalyst systems can control the molecular weight distribution of isotactic polypropylene when used with the invention processes or for the invention polymers. In one embodiment of the processes disclosed herein, the polymerization reaction(s) can be conducted with two or more catalyst compounds at the same time or in series. In particular, two different catalyst compounds can be activated with the same or different activators and introduced into the polymerization system at the same or different times. These systems can also, optionally, be used with diene incorporation to facilitate long chain branching using mixed catalyst systems and high levels of vinyl terminated polymers.

As disclosed herein, two or more of the above catalyst compounds can be used together. In another form, the catalyst combinations include any two or more of:

μ-dimethyl silylbis(-2-methyl, 4-phenylindenyl)zirconium dichloride,
μ-dimethyl silylbis(-2-methyl, 4-phenylindenyl)zirconium (hafnium too)dimethyl,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilyl(tetramethylcyclopentadienyl)(cyclododecylamido)titanium dimethyl,
dimethylsilyl(tetramethylcyclopentadienyl)(cyclododecylamido)titanium dichloride,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilylbis(indenyl)hafnium dichloride,
dimethylsilylbis(indenyl)hafnium dimethyl,
dimethylsilyl bis(2-methylindenyl)zirconium dichloride,
dimethylsilyl bis(2-methylindenyl)zirconium dimethyl,
dimethylsilyl bis(2-methylfluorenyl)zirconium dichloride,
dimethylsilyl bis(2-methylfluorenyl)zirconium dimethyl,
dimethylsilyl bis(2-methyl-5,7-propylindenyl)zirconium dichloride,
dimethylsilyl bis(2-methyl-5,7-propylindenyl)zirconium dimethyl,
dimethylsilyl bis(2-methyl-5-phenylindenyl)zirconium dichloride,
dimethylsilyl bis(2-methyl-5-phenylindenyl)zirconium dimethyl,
dimethylsilyl bis(2-ethyl-5-phenylindenyl)zirconium dichloride,
dimethylsilyl bis(2-ethyl-5-phenylindenyl)zirconium dimethyl,
dimethylsilyl bis(2-methyl-5-biphenylindenyl)zirconium dichloride, and
dimethylsilyl bis(2-methyl-5-biphenylindenyl)zirconium dichloride dimethyl.

One combination of catalyst compounds includes: dimethylsilyl (tetramethylcyclopentadienyl) (dodecylamido)titanium dichloride and μ-dimethyl silylbis(-2-methyl, 4-phenylindenyl)zirconium dichloride. Another combination of catalyst compounds includes dimethylsilyl(tetramethylcyclopentadienyl) (dodecylamido)titanium methyl and μ-dimethyl silylbis(-2-methyl, 4-phenylindenyl)zirconium dimethyl. Yet another combination of catalyst compounds includes 1,1'-bis(4-triethylsilylphenyl)methylene-(cyclopentadienyl)(2,7-di-tertiary-butyl-9-fluorenyl)hafnium dichloride and μ-dimethyl silylbis(-2-methyl, 4-phenylindenyl)zirconium dichloride. Still yet another combination of catalyst compounds includes 1,1'-bis(4-triethylsilylphenyl)methylene-(cyclopentadienyl)(2,7-di-tertiary-butyl-9-fluorenyl) hafnium dimethyl and μ-dimethyl silylbis(-2-methyl, 4-phenylindenyl)zirconium dimethyl.

Another combination of catalyst compounds includes any of the above catalysts (preferably dimethylsilyl bis(2,2,5,5-tetramethyl cyclohexyl indenyl)hafnium dimethyl), with one or more of dimethylsilyl bis(2-methyl, 5-phenyl-indenyl)zirconium dichloride, dimethylsilyl bis(2-methyl, 5-phenyl-indenyl)zirconium dibromide, dimethylsilyl bis(2-methyl, 5-phenyl-indenyl)zirconium dimethyl, dimethylsilyl bis(2-methyl, 5-phenyl-indenyl) Zr(N—R)2 where R is methyl, ethyl, butyl or hexyl).

The process of the present invention can use one or more catalysts in any of the reactors of the polymerization reactor section. Any number of catalysts can be deployed in any of the reactors of the polymerization reactor section of the present invention. For practical reasons, no more than five catalysts are preferred and no more than three catalysts are more preferred in any given reactor. The process of the present invention can use the same or different catalysts or catalyst mixtures in the different individual reactors of the reactor section of the present invention. For practical reasons, the deployment of no more than ten catalysts is preferred and the deployment of no more than six catalysts is more preferred in the polymerization process of the present invention.

The one or more catalysts deployed in the process of the present invention can be homogeneously dissolved in the polymerization system or can form a heterogeneous solid phase in the reactor. Operations with homogeneously dissolved catalysts are preferred. When the catalyst is present as a solid phase in the polymerization reactor, it can be supported or unsupported. The process of the present invention can use any combination of homogeneous and heterogeneous catalysts simultaneously present in one or more of the individual reactors of the polymerization reactor section, i.e., any reactor of the polymerization section of the present invention can contain one or more homogeneous catalysts and one or more heterogeneous catalysts simultaneously.

The process of the present invention can use any combination of homogeneous and heterogeneous catalysts deployed in the polymerization reactor section of the present invention. These combinations comprise scenarios when some or all reactors use a single catalyst and scenarios when some or all reactors use more than one catalyst. One or more catalysts deployed in the process of the present invention can be supported on particles using fumed silica as support, which either can be dispersed in the fluid polymerization system or can be contained in a stationary catalyst bed.

When the supported catalyst particles are dispersed in the polymerization system, they can be left in the polymeric product or can be separated from the product prior to its crystallization from the fluid reactor effluent in a separation step that is downstream of the polymerization reactor section. If the catalyst particles are recovered, they either can be discarded or can be recycled with or without regeneration. The catalyst can also be supported on structured supports, such as monoliths comprising straight or tortuous channels, reactor walls, internal tubing, etc. These structured supports are well known in the art of heterogeneous catalysis.

When the catalyst(s) is (are) supported, operation with dispersed or otherwise defined particles is preferred. When the catalyst is supported on dispersed particles, operations without catalyst recovery are preferred, i.e., the catalyst is left in the polymeric product of the process of the present invention. Unsupported catalysts dissolved in the polymerization system are most preferred. The catalyst(s) can be introduced any number of ways to the reactor. For example, the catalyst(s) can be introduced with the monomer-containing feed or separately.

In addition, the catalyst(s) can be introduced through one or multiple ports to the reactor. If multiple ports are used for introducing the catalyst(s), those ports can be placed at essentially the same or at different positions along the length of the reactor. If multiple ports are used for introducing the catalyst(s), the composition and the amount of catalyst feed through the individual ports can be the same or different. Adjustment in the amounts and types of catalyst through the different ports enables the modulation of polymer properties, such as molecular weight distribution, composition, composition distribution, crystallinity, etc.

Activators and Activation Methods for Catalyst Compounds

The catalyst compounds described herein are combined with activators for use herein. An activator is defined as any combination of reagents that increases the rate at which a metal complex polymerizes unsaturated monomers, such as olefins. An activator can also affect the molecular weight, degree of branching, comonomer content, or other properties of the polymer.

A. Aluminoxane and Aluminum Alkyl Activators

In one form, one or more aluminoxanes are utilized as an activator in the in-line blending processes disclosed herein. Aluminoxanes, sometimes called alumoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes can also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0279586 B1, EP 0516476 A, EP 0594218 A1 and WO 94/10180.

When the activator is an aluminoxane (modified or unmodified), some embodiments select the maximum amount of activator at a 5000-fold molar excess Al/M over the catalyst compound (per metal catalytic site). The minimum activator-to-catalyst-compound is typically a 1:1 molar ratio.

B. Ionizing Activators

It is contemplated to use an ionizing or stoichiometric activator, that is neutral or ionic, such as tri(n-butyl)ammonium tetrakis(pentafluorophenyl)borate, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof as an activator herein. Also contemplated for use herein are neutral or ionic activators alone or in combination with aluminoxane or modified aluminoxane activators.

Examples of neutral stoichiometric activators include tri-substituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, napthyl or mixtures thereof. Alternately, the three groups are halogenated, preferably fluorinated, aryl groups. Alternately, the neutral stoichiometric activator is trisperfluorophenyl boron or trisperfluoronapthyl boron.

Ionic stoichiometric activator compounds can contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, now abandoned all of which are fully incorporated herein by reference.

C. Non-Ionizing Activators

Activators are typically strong Lewis-acids which can play either the role of ionizing or non-ionizing activator. Activators previously described as ionizing activators can also be used as non-ionizing activators.

Abstraction of formal neutral ligands can be achieved with Lewis acids that display an affinity for the formal neutral ligands. These Lewis acids are typically unsaturated or weakly coordinated. Examples of non-ionizing activators include R10(R11)3, where R10 is a group 13 element and R11 is a hydrogen, a hydrocarbyl, a substituted hydrocarbyl, or a functional group. Typically, R11 is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, aluminoxane, CuCl, Ni(1,5-cyclooctadiene)$_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Suitable non-ionizing activators include $R^{10}(R^{11})_3$, where $R^{10}$ is a group 13 element and $R^{11}$ is a hydrogen, a hydrocarbyl, a substituted hydrocarbyl, or a functional group. In one or more embodiments, $R^{11}$ is an arene or a perfluorinated arene.

Other non-ionizing activators include $B(R^{12})3$, where $R^{12}$ is an arene or a perfluorinated arene. Illustrative activators can include ionizing and non-ionizing activators based on perfluoroaryl borane and perfluoroaryl borates such as $PhNMe_2H+B(C_6F_5)_4^-$, $(C_6H_5)_3C^+ B(C_6F_5)_4^-$, and $B(C_6F_5)^3$. Additional activators that can be used are described in WO 03/064433A1, which is fully incorporated herein by reference.

Supports

In another embodiment, the catalyst compositions of this invention include a support material or carrier. For example, the one or more catalyst components and/or one or more activators can be deposited on, contacted with, vaporized with, bonded to, or incorporated within, adsorbed or absorbed in, or on, one or more supports or carriers.

The support material is any of the conventional support materials. Preferably, the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13, or 14 metal oxides. The preferred supports include silica, which can or can not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. In addition, combinations of these support materials can be used, for example, silica-chromium, silica-alumina, silica-titania and the like. Additional support materials can include those porous acrylic polymers described in EP 0 767 184 B1, which is fully incorporated herein by reference. Other support materials include nano-composites as described in PCT WO 99/47598, aerogels as described in WO 99/48605, spherulites as described in U.S. Pat. No. 5,972,510 and polymeric beads as described in WO 99/50311, which are all fully incorporated herein by reference.

It is preferred that the support material, most preferably an inorganic oxide, has a surface area in the range of from about 10 to about 700 m2/g, pore volume in the range of from about 0 to about 4.0 cc/g and average particle size in the range of from about 0.02 to about 50 µm. More preferably, the surface area of the support material is in the range of from about 50 to about 500 m2/g, pore volume of from about 0 to about 3.5 cc/g and average particle size of from about 0.02 to about 20 µm. Most preferably the surface area of the support material is in the range is from about 100 to about 400 m2/g, pore volume from about 0 to about 3.0 cc/g and average particle size is from about 0.02 to about 10 µm.

Non-porous supports can also be used as supports in the processes described herein. For example, in a preferred embodiment the nonporous, fumed silica supports described in U.S. Pat. No. 6,590,055 can be used.

Additional useful activators for use in the processes of this invention include clays that have been treated with acids (such as H2SO4) and then combined with metal alkyls (such as triethylaluminum) as described in U.S. Pat. No. 6,531,552 and EP 1 160 261 A1, which is fully incorporated herein by reference.

Preferred activators that can also be supports include ion-exchange layered silicate having an acid site of at most −8.2 pKa, the amount of the acid site is equivalent to at least 0.05 mmol/g of 2,6-dimethylpyridine consumed for neutralization. Preferred examples include chemically treated smectite group silicates, acid-treated smectite group silicates. Additional preferred examples of the ion-exchange layered silicate useful in this invention include layered silicates having a 1:1 type structure or a 2:1 type structure as described in "Clay Minerals (Nendo Kobutsu Gaku)" written by Haruo Shiramizu (published by Asakura Shoten in 1995).

Examples of an ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizaldite, antigorite or the like. Additional preferred examples of the ion-exchange layered silicate useful in this invention include ion-exchange layered silicates comprising the 2:2 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. The clays are contacted with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called as a guest compound. Among these treatments, acid treatment or salt treatment is particularly preferable. The treated clay can then be contacted with an activator compound, such as TEAL, and the catalyst compound to polymerize olefins.

In another embodiment the polymerization system comprises less than 5 weight % polar species, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm. Polar species include oxygen containing compounds (except for alumoxanes) such as alcohols, oxygen, ketones, aldehydes, acids, esters and ethers.

In another embodiment the polymerization system comprises less than 5 weight % trimethylaluminum and/or triethylaluminum, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm.

In another preferred embodiment the polymerization system comprises methylalumoxane and less than 5 weight % trimethylaluminum and or triethylaluminum, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm.

Preferred invention processes can use finely divided, supported catalysts to prepare propylene/1-hexene copolymers with greater than 1.0 mole % hex-1-ene. In addition to finely divided supports, invention processes can use fumed silica supports in which the support particle diameter can range from 200 angstroms to 1500 angstroms, small enough to form a colloid with reaction media.

Scavengers

Compounds that destroy impurities without destroying the catalyst are referred to as scavengers by one skilled in the art of polymerization. Impurities can harm catalysts by reducing their activity. Scavengers can be optionally fed to the reactor(s) of the process disclosed herein. Catalytic activity can be defined many different ways. For example, catalytic activity can be expressed as turnover frequency, i.e., the number of moles of monomers converted to the product in a unit time by one mole of catalyst. For a given reactor operating at the same residence time, catalytic activity can also be measured in terms of catalyst productivity, customarily expressed as the weight of polymer made by a unit weight of catalyst.

The scavengers for use in the processes disclosed herein can be different chemical compound(s) from the catalyst activator. Non-limiting exemplary scavengers include alkyl aluminum compounds, such as trimethyl aluminum, triethyl aluminum, tri-isobutyl aluminum, and trioctyl aluminum. The scavenger can also be the same as the catalyst activator and is generally applied in excess of what is needed to fully activate the catalyst. These scavengers include, but are not limited to, aluminoxanes, such as methyl aluminoxane. The scavenger can also be introduced to the reactor with the monomer feed or with any other feed stream. In one particular embodiment, the scavenger is introduced with the monomer-containing feed. The scavenger can be homogeneously dissolved in the polymerization polymerization system or can form a separate solid phase. In one particular embodiment, scavengers are dissolved in the polymerization system.

Solvents/Diluents

Preferred solvents/diluents for use in the present invention include one or more of C2-C24 alkanes, preferably propane, n-butane, i-butane, n-pentane, i-pentane, n-hexane, mixed hexanes, cyclopentane, cyclohexane, etc., single-ring aromatics, such as toluene and xylenes. In some preferred embodiments, the diluent comprises one or more of ethane, propane, butane, isobutane, isopentane, and hexanes. In preferred embodiments, the diluent is recyclable.

Preferred diluents also include C4 to C150 isoparaffins, preferably C4 to C100 isoparaffins, preferably C4 to C25 isoparaffins, more preferably C4 to C20 isoparaffins. By isoparaffin is meant that the paraffin chains possess C1 to C10 alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, and between 10 and 24 in another embodiment, and from 10 to 15 in yet another embodiment. Various isomers of each carbon number will typically be present. The isoparaffins can also include cycloparaffins with branched side chains, generally as a minor component of the isoparaffin. Preferably, the density (ASTM 4052, 15.6/15.6° C.) of these isoparaffins ranges from 0.65 to 0.83 g/cm3; the pour point is −40° C. or less, preferably −50° C. or less, the viscosity (ASTM 445, 25° C.) is from 0.5 to 20 cSt at 25° C.; and the average molecular weights in the range of 100 to 300 g/mol. Some suitable isoparaffins are commercially available under the trade name ISOPAR (ExxonMobil Chemical Company, Houston Tex.), and are described in, for example, U.S. Pat. Nos. 6,197,285, 3,818,105 and 3,439,088, and sold commercially as ISOPAR series of isoparaffins. Other suitable isoparaffins are also commercially available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point range=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment, preferred diluents include C4 to C25 n-paraffins, preferably C4 to C20 n-paraffins, preferably C4 to C15 n-paraffins having less than 0.1%, preferably less than 0.01% aromatics. Some suitable n-paraffins are commercially available under the trade name NORPAR (ExxonMobil Chemical Company, Houston Tex.), and are sold commercially as NORPAR series of n-paraffins. In another embodiment, preferred diluents include dearomaticized aliphatic hydrocarbon comprising a mixture of normal paraffins, isoparaffins and cycloparaffins. Typically they are a mixture of C4 to C25 normal paraffins, isoparaffins and cycloparaffins, preferably C5 to C18, preferably C5 to C12. They contain very low levels of aromatic hydrocarbons, preferably less than 0.1, preferably less than 0.01 aromatics. Suitable dearomatized aliphatic hydrocarbons are commercially available under the trade name EXXSOL (ExxonMobil Chemical Company, Houston Tex.), and are sold commercially as EXXSOL series of dearomaticized aliphatic hydrocarbons.

In another embodiment the diluent comprises up to 20 weight % of oligomers of C6 to C14 olefins and/or oligomers of linear olefins having 6 to 14 carbon atoms, more preferably 8 to 12 carbon atoms, more preferably 10 carbon atoms having a Kinematic viscosity of 10 or more (as measured by ASTM D 445); and preferably having a viscosity index ("VI"), as determined by ASTM D-2270 of 100 or more.

In another embodiment, the diluent comprises up to 20 weight % of oligomers of C20 to C1500 paraffins, preferably C40 to C1000 paraffins, preferably C50 to C750 paraffins, preferably C50 to C500 paraffins. In another embodiment, the diluent comprises up to 20 weight % of hydrofinished oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the trade names Synfluid™ available from ChevronPhillips Chemical Co. in Pasedena Tex. Durasyn™ available from BP Amoco Chemicals in London England, Nexbase™ available from Fortum Oil and Gas in Finland, Synton™ available from Crompton Corporation in Middlebury Conn. USA, EMERY™ available from Cognis Corporation in Ohio, USA.

In another embodiment, the diluent comprises a fluorinated hydrocarbon. Preferred fluorocarbons for use in this invention include perfluorocarbons ("PFC" or "PFC's") and or hydrofluorocarbons ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, C1 to C40 perfluoroalkanes. A hydrofluorocarbon is a compound consisting essentially of carbon, fluorine and hydrogen. Preferred FC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is an integer greater than or equal to 0 and z is an integer and at least one, more preferably, y and z are integers and at least one. For purposes of this invention and the claims thereto, the terms hydrofluorocarbon and fluorocarbon do not include chlorofluorocarbons.

In another embodiment, a mixture of fluorocarbons is used in the process of the invention, preferably a mixture of a perfluorinated hydrocarbon and a hydrofluorocarbon, and more preferably a mixture of a hydrofluorocarbons. In yet another embodiment, the hydrofluorocarbon is balanced or unbalanced in the number of fluorine atoms in the HFC used.

In addition to those fluorocarbons described herein, those fluorocarbons described in Raymond Will, et. al., CEH Marketing Report, Fluorocarbons, Pages 1-133, by the Chemical Economics Handbook-SRI International, April 2001, which is fully incorporated herein by reference, is included.

In another preferred embodiment, the fluorocarbon(s) used in the process of the invention are selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-Pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane.

In another embodiment, the fluorocarbon is not a perfluorinated C4 to C10 alkane. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, or perfluorotoluene. In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %. In some embodiments, the fluorocarbons are preferably present in the polymerization reaction media at 0 to 20 volume %, based upon the volume of the media, preferably the fluorocarbons are present at 0 to 10 volume %, preferably 0 to 5 volume %, preferably 0 to 1 volume %, With regard to the polymerization system, preferred diluents and solvents are those that are soluble in and inert to the monomer and any other polymerization components at the polymerization temperatures and pressures used.

Polymerization Process

One or more reactors in series or in parallel can be used. The catalyst compound and activator can be delivered as a solution or slurry, either separately to the reactor, activated in-line just prior to the reactor, or preactivated and pumped as an activated solution or slurry to the reactor. A preferred operation is two solutions activated in-line. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component can also be added to both reactors, with one component being added to first reaction and another component to other reactors.

In one or more embodiments, polymerization can occur in high-pressure reactors where, preferably, the reactor is substantially unreactive with the polymerization reaction components and is able to withstand the high pressures and temperatures that occur during the polymerization reaction. Such reactors are known as high-pressure reactors for purposes of this disclosure. Withstanding these high pressures and temperatures will allow the reactor to maintain the polymerization system in its homogeneous condition. Suitable reaction vessels include those known in the art to maintain high-pressure polymerization reactions. Suitable reactors are selected from autoclave, pump-around loop or autoclave, tubular, and autoclave/tubular reactors, among others.

Autoclave reactors can be operated in batch or continuous mode. To provide better productivity, and thus to lower production cost, continuous operation is preferred in commercial operations. Tubular reactors always operate in continuous mode. Typically, autoclave reactors have length-to-diameter ratios of 1:1 to 20:1 and are fitted with a high-speed (up to 2000 RPM) multiblade stirrer. Commercial autoclave pressures are typically greater than 5 MPa with a maximum of typically less than 20 MPa. The maximum pressure of commercial autoclaves, however, can increase with advances in mechanical engineering and material science. When the autoclave has a low length-to-diameter ratio (such as less than four), the feed streams are typically injected at only one position along the length of the reactor. Reactors with large length-to-diameter ratios can have multiple injection ports at nearly the same position along the length of the reactor but radially distributed to allow for faster intermixing of the feed components with the polymerization system. In the case of stirred tank reactors, the separate introduction of the catalyst is possible and often preferred. Such introduction prevents the possible formation of hot spots in the unstirred feed zone between the mixing point and the stirred zone of the reactor. Injections at two or more positions along the length of the reactor are also possible and sometimes preferred. For instance, in reactors where the length-to-diameter ratio is around 4-20, the reactor preferably can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for a different degree of plug flow and back mixing, largely independently, in the separate zones. Two or more autoclaves with one or more zones can connect in series cascade to increase residence time or to tailor polymer structure. A series reactor cascade consists of two or more reactors connected in series, in which the effluent of at least one upstream reactor is fed to the next reactor downstream in the cascade. Besides the effluent of the upstream reactor(s), the feed of any reactor in the series cascade can be augmented with any combination of additional monomer, catalyst, or solvent fresh or recycled feed streams. Two or more reactors can also be arranged in a parallel configuration. The individual arms of such parallel arrangements are called reactor trains. These reactor trains in turn can themselves comprise one reactor or a reactor series cascade creating a combination of series and parallel reactors.

Tubular reactors are also well suited for use in this invention, preferably tubular reactors capable of operating up to about 300 MPa. Preferred tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Another way of addressing wall deposits is to fabricate the tube with smooth, unpolished internal surfaces. Preferred tubular reactors can operate at pressures up to 300 MPa and preferably have lengths of 100-2500 meters and internal diameters usually less than 10 cm thus sometimes have length/diameter ratios over 20,000.

Reactor trains that pair autoclaves with tubular reactors can also serve in invention processes. In such instances, the autoclave typically precedes the tubular reactor or the two types of reactors form separate trains of a parallel reactor configuration. Such systems can have injection of additional catalyst and/or feed components at several points in the autoclave and more particularly along the tube length.

In both autoclaves and tubular reactors, at injection, feeds are preferably cooled to near ambient temperature or below to provide maximum cooling and thus maximum polymer production within the limits of maximum operating temperature. In autoclave operation, a preheater operates at startup, but not after the reaction reaches steady state if the first mixing zone has some back-mixing characteristics. In tubular reactors, the first section of double-jacketed tubing is heated rather than cooled and is operated continuously. A well-designed tubular reactor is characterized as plug flow. Plug flow is a flow pattern with minimal radial flow rate differences. In both multizone autoclaves and tubular reactors, catalyst can be injected at the inlet, and optionally at one or more points along the reactor. The catalyst feeds injected at the inlet and other injection points can be the same or different in terms of content, density, concentration, etc. Choosing different catalyst feeds allows polymer design tailoring. At the reactor outlet valve, the pressure drops to levels below that which critical phase separation occurs. Therefore, the downstream separation vessel contains a polymer-rich phase and a polymer-lean phase. The autoclave or tubular reactor effluent is depressurized on entering the high pressure separator (HPS). In polymerizations based on propylene, alternative choices are open to the design relative to classic high pressure polyethylene process technology.

At the reactor outlet valve, the pressure drops to begin the separation of polymer and unreacted monomer, co-monomers, inerts, like ethane, propane, solvents, like hexanes, toluene, etc. The temperature in this vessel should be maintained above the polymer product's crystallization point but the pressure can be below the critical point, if a critical point can be determined. The pressure need only be high enough that the propylene can be condensed against standard cooling water. The liquid recycle stream can then be recycled to the reactor with a liquid pumping system instead of the hyper-compressors required for polyethylene units. The relatively low pressure in this separator will reduce the monomer concentration in the liquid polymer phase that will result in a much lower polymerization rate. This polymerization rate can be low enough to operate this system without adding a catalyst poison or "killer." If a catalyst killer is required (e.g., to prevent reactions in the high pressure recycle) then provision must be made to remove any potential catalyst poisons from the recycled propylene rich monomer stream e.g., by the use of fixed bed adsorbents or by scavenging with an aluminum alkyl.

Alternatively, the HPS can be operated over the critical pressure of the monomer or monomer blend but within the monomer/polymer two-phase region. This is the economically preferred method if the polymer is to be produced with a revamped high-pressure polyethylene (HPPE) plant. The recycled HPS overhead is cooled and "dewaxed" before being returned to the suction of the secondary compressor, which is typical of HPPE plant operation.

The polymer from this intermediate or high pressure vessel will then go through another pressure reduction step to a low pressure separator. The temperature of this vessel will be maintained above the polymer melting point so that the polymer from this vessel can be fed as a liquid directly to an extruder or static mixer. The pressure in this vessel will be kept low by using a compressor to recover the unreacted monomers, etc to the condenser and pumping system referenced above.

In addition to autoclave reactors, tubular reactors, or a combination of these reactors, loop-type reactors are useful in this invention. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop.

In general, feed inlet temperatures are generally near to or below ambient temperatures to provide cooling to the exothermic reaction in the reactor operating above the crystallization temperature of the polymer product.

The processes described herein can have residence times as short as 0.5 seconds and as long as an hour. In preferred embodiments, the residence times are from 10 seconds to 60 minutes, preferably from 15 seconds to 30 minutes, more preferably from 30 seconds to 30 minutes, more preferably from 2 minutes to 30 minutes. In some embodiments, the residence time can be selected from 10, 30, 45, 50 seconds, 1, 5, 10, 15, 20, 25, 30 and 60 minutes. Practical maximum residence times can be selected from 5, 10, 15, 30, 60 minutes. In general, invention processes choose residence times of from 1 minute to 60 minutes; more particularly 2 minutes to 30 minutes.

Dividing the total quantity of polymer that is collected during the reaction time by the amount of monomer added to the reaction yields the conversion rate. The monomer-to-polymer conversion rate for the described processes can be as high as 90%. For practical reasons, for example for limiting viscosity, lower conversions could be preferred. In addition, for practical reasons, for example for limiting the cost of monomer recycle, minimum conversions could be preferred. Thus, the process can be run at practical conversion rates of 80, 60 or less percent, 3-80, 5-80, 10-70, 15-70, 20-70, 25-60, 3-60, 5-60, 10-60, 15-60, 20-60, 10-50, 5-40, 10-40, 40-50, 15-40, 20-40, or 30-40 percent conversion, preferably greater than 10, or greater than 20 percent conversion.

Catalyst productivities range from 100 to 500,000 kg PP/(kg catalyst hr). These high levels of catalyst productivity can result in low residual ash in the polymer product. Residual total ash of less than 0.5 wt %, particularly less than 0.3 wt %, more particularly less than 0.1 wt % are preferred.

Comonomers, Dual Catalysts and Polymer Structure

In reactors with multiple injection points for catalyst and feed, there exists the possibility to tailor the polymer design. Use of more than one catalyst having different molecular weight and structural capabilities allows a wide variety of product compositions (e.g., bimodal, linear mixed with long chain branched). The various olefins will have differing reactivity ratios for a given catalyst so a plug flow operation will allow compositional tapering if for instance no feeds are injected down the reactor or compensation of the tapering if the more reactive monomer is injected preferentially along the tube. A single zone ideal back mixed autoclave reactor will not allow tapering of polymer composition but the use of multiple catalysts is still applicable. Operation of two such autoclaves in series or parallel can allow the use of tailoring by altering the composition of fresh feed to the second reactor.

When multiple reactors are used, the production of polymer blends is possible. In one embodiment, homopolymer and copolymer blends are made by using at least two reactors in parallel or series. The homopolymers could be polypropylene, polybutene, polyhexene, polyoctane, etc. In a preferred embodiment, the homopolymer comprises polypropylene, polybutylene, polyhexene, and polystyrene. In a more preferred embodiment, the homopolymer is polypropylene. The copolymers could be any two- or three-component combinations of ethylene, propylene, butene-1, 4-methylpentene-1, hexene-1, octene-1, styrene, norbornene, 1,5-hexadiene, and 1,7-octadiene. In a more preferred embodiment, the copolymers are made from a two-component combination of ethylene, propylene, butene-1, hexene-1, styrene, norbornene, 1,5-hexadiene, and 1,7-octadiene. In another preferred embodiment, the copolymer is an ethylene-propylene, propylene-butene-1, propylene-hexene-1, propylene-butene-1, ethylene-butene-1, ethylene-hexene-1, ethylene-octene-1 copolymer. When the polymer blends are made in a series reactor cascade, one or more upstream reactors are fed with a single monomer-containing feed, while the feed of one or more downstream reactors is augmented with a comonomer feed stream. Since controlling the ratio of the homo- and copolymer is difficult in a series cascade reactor configuration, parallel reactor configuration is preferred in the production of polymer blends.

Product Separation and Downstream Processing

The reactor effluents can be depressurized to an intermediate pressure significantly below the cloud point pressure. This allows separation of a polymer rich phase for further purification and a monomer rich phase for recycle compression back to the reactor(s). The reactor effluents can be optionally heated before pressure let down to avoid the separation of a solid polymer phase, which causes fouling of the separators and associated reduced-pressure lines. The separation of the polymer-rich phase and the monomer-rich phase in the processes disclosed herein is carried out in a vessel known as a high-pressure separator (also referred to as an HPS, separator or separator vessel).

The polymer rich phase of the separator-blender can then be transferred to a low pressure separator (LPS) running at just above atmospheric pressure for a simple flash of light components, reactants and oligomers thereof, for the sole purpose of producing a low volatile-containing polymer melt entering the finishing extruder or static mixer.

In one embodiment, polymerization is conducted herein above the cloud point for the polymerization system. Then, the polymer-monomer mixtures are transferred into a separation-blending vessel, where the pressure is allowed to drop below the cloud point. This advantageously results in the denser, polymer-rich phase separating from the lighter monomer-rich phase. As can be appreciated by those skilled in the art, it can optionally be necessary to increase the temperature in the separation vessel to prevent the formation of a solid polymer phase as the polymer becomes more concentrated. The monomer-rich phase is then separated and recycled to the reactors while the polymer-rich phase is fed to a coupled devolatilizer—such as a LIST dryer (DTB) or devolatizing extruder.

The recycle runs through a low pressure separator, where the pressure depends on the pressure-temperature relationship existing within the reactor. For example, polymerization can be carried out under agitation in the single-phase region in the reactor at 40-200 MPa and 95-180° C. (see FIG. 3). On exiting the reactor, the product mixture is discharged into a low-pressure separator vessel, where the pressure is dropped to a level of 25 MPa bar or lower, in which case, the mixture is below its cloud point, while the monomer has not yet flashed off (again, see FIG. 3). Under such conditions, it would be expected from Radosz et al., Ind. Eng. Chem. Res. 1997, 36, 5520-5525 and Loos et al., Fluid Phase Equil. 158-160, 1999, 835-846 that the monomer-rich phase would comprise less than about 0.1 wt % of low molecular weight polymer and have a density of approximately 0.3-0.4 g/mL (see FIG. 4). The polymer-rich phase would be expected to have a density of approximately 0.6-0.7 g/mL.

Assuming that the pressure is dropped rapidly enough, for example, greater than or equal to about 6 MPa/sec, the phases will separate rapidly, permitting the recycle of the monomer-rich phase as a liquid, without the issue of having the monomer-rich phase return to the gas phase. As can be appreciated by those skilled in the art, this eliminates the need for the energy-intensive compression and condensation steps.

The polymer-rich phase is sent directly to a coupled devolatilizer. Suitable devolatilizers can be obtained, for example, from LIST USA Inc., of Charlotte, N.C. The devolatilization is a separation process to separate remaining volatiles from the final polymer, eliminating the need for steam stripping. Working under low vacuum, the polymer solution flashes into the devolatilizer, exits the unit and is then transferred on for further processing, such as pelletization.

Any low or very low molecular weight polymer present in the monomer-rich phase to be recycled can optionally be removed through "knock-out" pots, standard hardware in reactors systems, or left in the return stream depending upon product requirements and the steady-state concentration of the low molecular weight polymer fraction in the product.

In solution reactor processes, present practices employed by those skilled in the art typically effect separation by flashing monomer and solvent or accessing the high-temperature cloud point.

In another form, polymerization is conducted at conditions below the cloud point, with the polymer-monomer mixture transported to a gravimetric separation vessel, where the pressure could be further lowered if desired to enhance phase separation of the polymer-rich and monomer-rich phases. In either of the forms herein described, the monomer, for example, propylene, is recycled while staying in a relatively high density, liquid-like (homogeneous or bulk liquid) state. Once again, one or more knock-out pots or sieves can be employed to aid in the removal of low molecular weight polymer from the recycle stream.

As can be appreciated, there are possible and optimal operating regimes for reactors and for the gravity (lower critical solution temperature (LCST) separator. Referring now to FIG. 5, for reactors operating in a single liquid phase regime, a possible region for operation is just above the LCST and vapor pressure (VP) curves. The optimal region (shown within the shaded oval) for operation occurs at temperatures just above the lower critical end point (LCEP) and at pressures slightly above the LCST curve.

Referring now to FIG. 6, for reactors operating within a two-phase fluid-fluid regime, the possible region for operation occurs basically anywhere below the LCST curve. The optimal region (again, shown within the shaded oval) occurs just below the LCST and above the VP curve, although, as can be appreciated, many factors could have a bearing on what actually is optimal, such as the final properties of the desired product. As recognized by those skilled in the art, the two-phase liquid-liquid regime is the economically preferred method if polypropylene is to be produced with a revamped HPPE plant.

Referring now to FIG. 7, for the case where polymerization is conducted at conditions below the cloud point and the polymer-monomer mixture transported to a gravimetric LCST separator, the possible region of operation is anywhere below the LCST curve and above the VP curve. The optimal region (again, shown within the shaded oval) occurs within that portion that is below the spinodal, but not too low in pressure, as shown. Operating in this regime assures that the energy use is optimized. It is also desirable to avoid operation in the region between the LCST and spinodal curves in order to obtain good gravity settling performance. Moreover, it is desirable that the separation is effected at sufficiently high temperatures, so that crystallization does not occur in the polymer-rich phase. This can require that the temperature of the mixture in the separator be higher than the temperature in the reactor(s).

Advantageously, the liquid monomer-rich recycle stream can be recycled to the reactor using a liquid pumping system instead of a hyper-compressor, required for conventional polyethylene units.

Catalyst Killing and Product Separation

The reactor effluent is depressurized to an intermediate pressure significantly below the cloud point pressure. This allows separation of a polymer rich phase for further purification and a propylene rich phase for recycle compression back to the reactor. Sometimes, heating the reactor effluent before pressure let down is necessary to avoid the separation of a solid polymer phase causing fouling.

This separation is carried out in a vessel known as a high-pressure separator (HPS). Since this vessel also has a significant residence time, the catalyst activity is killed by addition of a polar species such as water, alcohol or sodium/calcium stearate. The choice and quantity of killing agent will depend on the requirements for clean up of the recycle propylene and comonomers as well as the product properties, if the killing agent has low volatility.

Alternatively, the intermediate separation can be done at pressures well below the critical point so that the monomer concentration and therefore reactivity in the high-pressure separator is relatively low. The relatively small amount of continued polymerization in this vessel can not be a problem so addition of catalyst deactivating compounds as is done in PE processes can be avoided presuming that no undesired reactions occur in the high or intermediate pressure recycle system. If no killing compounds are added then the killer removal step can be eliminated.

Choice of Propylene Feed Purity

Propylene is available commercially at two levels of purity—polymer grade at 99.5% and chemical grade at about 93 to 95%. The choice of feed will set the level of purge required from the recycle to avoid over dilution of the feed by inert propane. The presence of propane in the reactor and HPS will raise the pressure of the cloud point curve for a given temperature but will decrease the polymerization efficiency due to a decrease in propylene (and other olefin) concentrations in the reactor. The elevation of cloud point pressure due to propane will widen the operating window of the HPS. In copolymerizations of propylene with limited amounts of ethylene, a similar effect in raising the cloud point pressure will be noted due to the presence of low levels of ethylene in the HPS.

Polymer Products

The polymers produced by invention processes can be in any structures including block, linear, radial, star, branched, and combinations of these.

Some invention embodiments produce polypropylene and copolymers of polypropylene with a unique microstructure. The process of the invention can be practiced such that novel isotactic and syndiotactic compositions are made. In other embodiments, the invention processes make crystalline polymers.

The process produces propylene polymers (i.e., polymer product) with a melting point of 60° C. to 165° C., and a weight-average molecular weight of 2,000 to 1,000,000; 10,000 to 1,000,000; 15,000 to 500,000; 25,000 to 400,000; or 35,000 to 350,000. In one or more embodiments, the melting point of the polymer product is about 60° C. to about 160° C. In one or more embodiments, the melting point of the polymer product is about 65° C. to about 155° C. In one or more embodiments, the melting point of the polymer product is about 110° C. to about 160° C. In one or more embodiments, the melting point of the polymer product is about 120° C. to about 155° C. In one or more embodiments, the melting point of the polymer product is about 60° C. or more. In one or more embodiments, the melting point of the polymer product is about 80° C. or more. In one or more embodiments, the melting point of the polymer product is about 100° C. or more. In one or more embodiments, the melting point of the polymer product is about 110° C. or more. In one or more embodiments, the melting point of the polymer product is about 120° C. or more. In one or more embodiments, the melting point of the polymer product is about 130° C. or more. In one or more embodiments, the melting point of the polymer product is about 140° C. or more. In one or more embodiments, the melting point of the polymer product is about 150° C. or more. In one or more embodiments, the melting point of the polymer product is about 155° C. or more.

Invention processes produce polymer with a heat of fusion, ΔHf, of 1-30 J/g, 2-20 J/g, or 3-10 J/g. In another embodiment the process of this invention, produce polymers having a ΔHf of up to 110 J/g, preferably 40 to 110 J/g, and more preferably 50 to 100 J/g.

The processes described herein can produce polymers having little or no ash or residue from catalyst or supports. In a preferred embodiment, the polymers produced herein comprise less than 1 weight % silica, preferably less than 0.1 weight % silica, preferably less than 100 wt ppm silica, preferably less than 10 wt ppm.

Dienes can be used as a comonomer to increase the molecular weight of the resulting polymer and to create long chain branching. Vinyl chloride can be used as a comonomer to increase the degree of vinyl termination in the polymer.

Invention processes can produce long-chain-branched polypropylene. Long-chain branching is achievable using invention process regardless of whether additional α,ω-diene or other diene such as vinyl norbornene are used. In a preferred embodiment, less than 0.5 wt % diene is used. Alternatively, embodiments with less than 0.4 wt %, 0.3 wt %, 0.2 wt %, 1000 wt ppm, 500 wt ppm, 200 wt ppm, or 100 wt ppm.

In some embodiments, the present invention involves using as a comonomer a α,ω-diene and the olefin/α,ω-diene copolymers resulting from that use. Additionally, the present invention involves a copolymerization reaction of olefin monomers, wherein the reaction includes propylene and ethylene copolymerization with a α,ω-diene and the copolymers that are made. These copolymers can be employed in a variety of articles including, for example, films, fibers, such as spunbonded and melt blown fibers, fabrics, such as nonwoven fabrics, and molded articles. More particularly, these articles include, for example, cast films, oriented films, injection molded articles, blow molded articles, foamed articles, foam laminates and thermoformed articles.

It should be noted that while linear α,ω-dienes are preferred, other dienes can also be employed to make polymers of this invention. These would include branched, substituted α,ω-dienes, such as 2-methyl-1,9-decadiene; cyclic dienes, such as vinylnorbornene; or aromatic types, such as divinyl benzene.

Embodiments of the present invention include copolymers having from 98 to 99.999 weight percent olefin units, and from 0.001 to 2.000 weight percent α,ω-diene units. Copolymer embodiments can have a weight-average molecular weight from 30,000 to 2,000,000, crystallization temperatures from 50° C. to 140° C. and a melt flow rate (MFR) from 0.1 dg/min to >5000 dg/min. Note that these embodiments display high crystallization temperatures intrinsically; there is no need for externally added nucleating agents.

In other embodiments, the copolymer includes from 90 to 99.999 weight percent of propylene units, from 0.000 to 8 weight percent of olefin units other than propylene units and from 0.001 to 2 weight percent α,ω-diene units. Copolymer embodiments can have weight-average molecular weights from 20,000 to 2,000,000, crystallization temperatures (without the addition of external nucleating agents) from 85° C. to 135° C. and MFRs from 0.1 dg/min to greater than 5,000 dg/min. The accompanying olefin can be any of C2-C20 α-olefins, diolefins (with one internal olefin) and their mixtures thereof. More specifically, olefins include ethylene, butene-1, pentene-1, hexene-1, heptene-1, 4-methyl-1-pentene, 3-methyl-1-pentene, 4-methyl-1-hexene, 5-methyl-1-hexene, 1-octene, 1-decene, 1-undecene, and 1-dodecene. Copolymers of isotactic polypropylene made under homogeneous conditions include ethylene and $C_4$-$C_{12}$ comonomers such as butene, 3-methylpentene, hexene, 4-methylpentene, and octene.

In a preferred embodiment the polymers have a residual solid amount of less than 0.5 wt %, particularly less than 0.3 wt %, or more particularly less than 0.1 wt % total solids residue are preferred.

Preferred propylene polymers produced typically comprise 0 to 40 weight % of a comonomer, preferably 1 to 40 weight %, preferably 2 to 30 weight %, preferably 4 to 20 weight %, preferably 5 to 15 weight %, preferably 5 to 10 weight %, and/or have one or more of:

1. a heat of fusion (ΔHf) of 30 J/g or more, preferably 50 J/g or more, preferably 60 J/g or more, preferably 70 J/g or more, preferably 80 J/g or more, preferably 90 J/g or more, preferably 95 J/g or more, preferably 100 J/g or more, preferably 105 J/g or more or an ΔHf of 30 J/g or less, more preferably 20 J/g or less preferably 0;
2. a weight average molecular weight (as measured by GPC DRI) of 20,000 or more, preferably 30,000 to 2,000,000, preferably 60,000 to 1,000,000, preferably 100,000 to 900,000, preferably 160,000 to 700,000;
3. a melt flow rate of 0.1 dg/min or more, preferably 0.5 dg/min or more, preferably 1.0 dg/min or more, preferably between 0.1 and 5000 dg/min;
4. a melting temperature of 85° C. or more, preferably 120° C. or more, preferably 150° C. or more, preferably between 155 and 160° C.;
5. a crystallization temperature of 25° C. or more, preferably 45° C. or more, preferably 65° C. or more, preferably 100° C. or more; and
6. a Mw/Mn (as measured by GPC DRI) of about 1 to 20, preferably about 1.5 to 8, preferably 2 to 4.

In another embodiment, the polymers produced herein have a melt viscosity of less than 10,000 centipoises at 180° C. as measured on a Brookfield viscometer, preferably between 1000 to 3000 cps for some embodiments (such as packaging and adhesives) and preferably between 5000 and 10,000 for other applications.

Formulations

In some embodiments, the polymer produced by this invention can be blended with one or more other polymers, including but not limited to, thermoplastic polymer(s) and/or elastomer(s).

A "thermoplastic polymer(s)" is a polymer that can be melted by heat and then cooled with out appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic C2 to C40 olefins, preferably polymers comprising propylene copolymerized with one or more C2 or C4 to C40 olefins, preferably a C3 to C20 alpha olefin, more preferably C3 to C10 α-olefins. More preferred polyolefins include, but are not limited to, polymers comprising ethylene including but not limited to ethylene copolymerized with a C3 to C40 olefin, preferably a C3 to C20 alpha olefin, more preferably propylene and or butene.

"Elastomers" encompass all natural and synthetic rubbers, including those defined in ASTM D1566). Examples of preferred elastomers include, but are not limited to, ethylene propylene rubber, ethylene propylene diene monomer rubber, styrenic block copolymer rubbers (including SI, SIS, SB, SBS, SEBS and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the polymer produced by this invention is combined with one or more of isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm3) linear low density polyethylene, ultra low density polyethylene (density 0.86 to less than 0.90 g/cm3), very low density polyethylene (density 0.90 to less than 0.915 g/cm3), medium density polyethylene (density 0.935 to less than 0.945 g/cm3), high density polyethylene (density 0.945 to 0.98 g/cm3), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, polymers that are a hydrolysis product of EVA that equate to an ethylene vinyl alcohol copolymer, polymers of aromatic monomers such as polystyrene, poly-1 esters, polyacetal, polyvinylidine fluoride, polyethylene glycols and/or polyisobutylene.

In another embodiment, elastomers are blended with the polymer produced by this invention to form rubber toughened compositions. In some particularly preferred embodiments, the rubber toughened composition is a two (or more) phase system where the elastomer is a discontinuous phase and the polymer produced by this invention is a continuous phase. This blend can be combined with tackifiers and/or other additives as described herein.

In another embodiment, the polymer produced by this invention can be blended with elastomers or other soft polymers to form impact copolymers. In some embodiments, the blend is a two (or more) phase system where the elastomer or soft polymer is a discontinuous phase and the polymer produced by this invention is a continuous phase. This blend can be combined with tackifiers and/or other additives as described herein.

In some embodiments, the polymers of the invention described above are combined with metallocene polyethylenes (mPEs) or metallocene polypropylenes (mPPs). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator can be supported or unsupported and the cyclopentadienyl rings by can substituted or unsubstituted. Several commercial products produced with such catalyst/activator combinations are commercially available from ExxonMobil Chemical Company in Baytown, Tex. under the trade names EXCEED™, ACHIEVE™ and EXACT™. For more information on the methods and catalysts/activators to produce such homopolymers and copolymers, see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

In some embodiments the polymer of this invention is present in the above blends, at from 10 to 99 weight %, based upon the weight of the polymers in the blend, preferably 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %.

The blends described above can be produced by (a) mixing the polymers of the invention with one or more polymers (as described above), by (b) connecting reactors together in series to make in situ reactor blends or by (c) using more than one catalyst in the same reactor to produce multiple species of polymers. The polymers can be mixed together prior to being put into the extruder or can be mixed in an extruder.

Any of the above polymers can be functionalized. Functionalized means that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C=O). Examples include maleic, fumaric, acrylic, methacrylic, itaconic, crotonic, alpha-methyl crotonic, and cinnamic acids as well as their anhydrides, esters and salt derivatives. Maleic anhydride is particularly preferred. The unsaturated acid or anhydride is preferably present at about 0.1 weight % to about 5 weight %, preferably at about 0.5 weight % to about 4 weight %, even more preferably at about 1 to about 3 weight %, based upon the weight of the hydrocarbon resin and the unsaturated acid or anhydride.

Tackifiers can be blended with the polymers of this invention and/or with blends of the polymer produced by this inventions (as described above). Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the tackifier is hydrogenated. In other embodiments, the tackifier is non-polar. (Non-polar tackifiers are substantially free of monomers having polar groups. Preferably, the polar groups are not present; however, if present, they are preferably not present at more that 5 weight %, preferably not more that 2 weight %, even more preferably no more than 0.5 weight %). In some embodiments, the tackifier has a softening point (Ring and Ball, as measured by ASTM E-28) of 80° C. to 140° C., preferably 100° C. to 130° C. In some embodiments the tackifier is functionalized. By functionalized is meant that the hydrocarbon resin has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, alpha-methyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride.

The tackifier, if present, is typically present at about 1 weight % to about 50 weight %, based upon the weight of the blend, more preferably 10 weight % to 40 weight %, even more preferably 20 weight % to 40 weight %. Preferably however, tackifier is not present, or if present, is present at less than 10 weight %, preferably less than 5 weight %, more preferably at less than 1 weight %.

In another embodiment, the polymers of this invention, and/or blends thereof, further comprise a crosslinking agent. Preferred crosslinking agents include those having functional groups that can react with the acid or anhydride group. Preferred crosslinking agents include alcohols, multiols, amines, diamines and/or triamines. Examples of crosslinking agents useful in this invention include polyamines such as ethylenediamine, diethylenetriamine, hexamethylenediamine, diethylaniinopropylamine, and/or menthanediamine.

In another embodiment the polymers of this invention, and/or blends thereof, further comprise typical additives known in the art such as fillers, cavitating agents, antioxidants, surfactants, adjuvants, plasticizers, block, antiblock, color masterbatches, pigments, dyes, processing aids, UV stabilizers, neutralizers, lubricants, waxes, and/or nucleating agents. The additives can be present in the typically effective amounts well known in the art, such as 0.001 weight % to 10 weight %.

Preferred fillers, cavitating agents and/or nucleating agents include titanium dioxide, calcium carbonate, barium sulfate, silica, silicon dioxide, carbon black, sand, glass beads, mineral aggregates, talc, clay and the like.

Preferred antioxidants include phenolic antioxidants, such as Irganox 1010, Irganox, 1076 both available from Ciba-Geigy. Preferred oils include paraffinic or naphthenic oils such as Primol 352, or Primol 876 available from ExxonMobil Chemical France, S.A. in Paris, France. More preferred oils include aliphatic naphthenic oils, white oils or the like.

Preferred plasticizers and/or adjuvants include mineral oils, polybutenes, phthalates and the like. Particularly preferred plasticizers include phthalates such as diisoundecyl phthalate (DIUP), diisononylphthalate (DINP), dioctylphthalates (DOP) and polybutenes, such as Parapol 950 and Parapol 1300 available from ExxonMobil Chemical Company in Houston Tex. Additional Preferred plasticizers include those disclosed in WOO 18109A1 and U.S. Ser. No. 10/640,435, now U.S. Pat. No. 7,619,026, which are fully incorporated herein by reference.

Preferred processing aids, lubricants, waxes, and/or oils include low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers.

Preferred functionalized waxes include those modified with an alcohol, an acid, or a ketone. Functionalized means that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, alpha-methyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride. Preferred examples include waxes modified by methyl ketone, maleic anhydride or maleic acid. Preferred low Mn polymers include polymers of lower alpha olefins such as propylene, butene, pentene, hexene and the like. A particularly preferred polymer includes polybutene having a Mn of less than 1000. An example of such a polymer is available under the trade name PARAPOL™ 950 from ExxonMobil Chemical Company. PARAPOL™ 950 is an liquid polybutene polymer having an Mn of 950 and a kinematic viscosity of 220 cSt at 100° C., as measured by ASTM D 445.

Preferred UV stabilizers and or antioxidants include Irganox 1010 and the like.

Applications

The polymers of this invention (and blends thereof as described above) whether formed in situ or by physical blending are preferably used in any known thermoplastic or elastomer application. Examples include uses in molded parts, films, tapes, sheets, tubing, hose, sheeting, wire and cable coating, adhesives, shoesoles, bumpers, gaskets, bellows, films, fibers, elastic fibers, nonwovens, spunbonds, sealants, surgical gowns and medical devices.

EXAMPLES

The foregoing discussion can be further described with reference to the following non-limiting examples. Six samples (Examples 1-6) according to one or more embodiments of the present invention are provided.

In each example, a 37 cc stainless steel autoclave reactor equipped with a magnetic stir bar was heated to 120° C. for one hour under a stream of dry nitrogen to dry the reactor. The reactor was cooled and subsequently charged with hexane (5 mL, 3.295 g, 38.2 mmol) and tri-n-octyl aluminum (0.029 mmol; added in a 1.5 mL solution of hexane) as a scavenger. The total amount of tri-n-octyl aluminum utilized was adjusted to achieve a targeted Al:M molar ratio (where M=Zr or Hf) not greater than 300:1. The reactor was purged with propylene gas (purity >99%, Airgas Corporation) and then sealed to maintain an atmosphere of propylene. The reactor was heated to 75° C., at which time more liquid propylene was added (29.5 mL; 15.104 g) via syringe pump to bring the pressure up to about 600 psi (4.1 MPa). Finally, the reactor was heated to the desired reaction temperature (about 105° C.) to generate a reactor pressure of about 1,500 psi (10.4 MPa) and the contents were stirred.

Separately, in a nitrogen-purged Glove Box, a toluene solution of rac-dimethylsilyl[bis(indenyl)]hafniumdimethyl (1 mg/mL) ("metallocene") and a toluene solution of [N,N-dimethylanilinium][tetrakis(heptafluoronapthyl)borate] (1 mg/mL) ("activator") were prepared. Utilizing these mixtures, rac-dimethylsilyl[bis(indenyl)]hafnium dimethyl (1238 ul, 1.238 mg; 0.0025 mmol) and [N,N-dimethylanilinium][tetrakis(heptafluoronapthyl)borate] (3435 ul; 3.435 mg; 0.003 mmol) were combined with 8.131 ml of dried degassed toluene with stirring. This mixture was stirred at room temperature for approximately 15 minutes. Next, in the dry box, 5.5 mL of this solution was charged to a previously dried syringe pump, sealed and attached to the 35 cc reactor. The activated catalyst toluene solution (about 1 mL; 0.00025 mmol) was introduced by over-pressurizing the feed line via syringe pump (about 2,000 psi; 13.8 MPa) above the reactor pressure (about 1,500 psi; 10.4 MPa).

After catalyst addition, propylene was added to maintain a pressure of about 2,000 psi (13.8 MPa). The reactor was maintained at temperature and pressure for about 30 minutes. Additional propylene is added to maintain the reactor pressure. The reaction was terminated by venting the contents into a vent collection vessel attached to the reactor vent line.

After cooling, product was recovered from the vent collector and the reactor. The product was dried in a vacuum oven for about 12 hours and the product was characterized by gel permeation chromatography (GPC) and differential scanning calorimetry (DSC). Table 1 below summarizes certain polymerization conditions and product properties.

TABLE 1

| | | | | | | |
|---|---|---|---|---|---|---|
| Catalyst A (micromol) | 0.25 | 0.25 | 0.25 | 0.25 | 0.25 | 0.25 |
| Reaction Temp. (° C.) | 105 | 105 | 105 | 105 | 105 | 105 |
| Exotherm (° C.) | 11 | 3 | 3 | 12 | 12 | 5 |
| Reaction Press. (psi) | 2000 | 2000 | 2000 | 2000 | 2000 | 2000 |
| Propylene in feed (wt. %) | 74 | 74 | 74 | 74 | 74 | 74 |
| Diluent (wt %) | 26 | 26 | 26 | 26 | 26 | 26 |
| Activator D9 (mmol) | 0.3 | 0.3 | 0.3 | 0.3 | 0.3 | 0.3 |
| TNOAl (mmol) | 0.029 | 0.029 | 0.029 | 0.029 | 0.029 | 0.029 |
| Al:Hf molar ratio | 115 | 115 | 115 | 115 | 115 | 115 |
| Rxn Time (Min) | 30 | 30 | 30 | 30 | 30 | 30 |
| Yield (g) | 2.299 | 1.357 | 1.109 | 1.733 | 2.14 | 1.78 |
| Mw (g/mol) | 84918 | 92264 | 113151 | 85886 | 87272 | 101371 |
| Mw/Mn | 1.94 | 1.92 | 1.89 | 1.93 | 1.95 | 1.9 |
| Tm (° C., 2nd Melt) | 128.8 | 129.1 | 130.8 | 129.2 | 129.5 | 130.1 |

The exotherm temperature is the initial temperature rise (° C.) due to the introduction of the catalyst system. The exotherm temperature rise was measured by a thermocouple located inside the reactor.

Embodiments further relate to:

1. A continuous process for polymerizing propylene, comprising: feeding about 40 wt % to about 80 wt % propylene monomer, based on total weight of propylene monomer and diluent, and about 20 wt % to about 60 wt % diluent, based on total weight of propylene monomer and diluent, into a reactor; polymerizing the propylene monomer in the presence of a catalyst, (optionally a metallocene catalyst and/or optionally a single sited catalyst) and an activator within the reactor at a temperature of about 80° C. or more and a pressure of about 13 MPa or more to produce a polymer product in a homogenous system, wherein about 20 to about 76 wt % (preferably 28 wt % to about 76 wt %) propylene monomer, based on total weight of the propylene monomer, diluent, and polymer product, is present at the reactor exit at steady state conditions.
2. The process according to paragraph 1, wherein conversion of the propylene monomer to polymer product is about 5 wt % to about 45 wt % (preferably 5 wt % to 35 wt %) of the propylene monomer.
3. The process according to paragraph 1 or 2, wherein conversion of the propylene monomer to polymer product is about 15 wt % to about 35 wt % of the propylene monomer.
4. The process according to any of paragraphs 1 to 3, wherein the polymer product has a melting temperature of about 60° C. to about 160° C.
5. The process according to any of paragraphs 1 to 4, wherein the polymer product has a melting temperature of about 65° C. to about 155° C.
6. The process according to any of paragraphs 1 to 5, wherein the polymer product has a melting temperature of about 110° C. to about 160° C.
7. The process according to any of paragraphs 1 to 6, wherein the polymer product has a melting temperature of about 120° C. to about 155° C.
8. The process according to any of paragraphs 1 to 7, wherein the pressure is of from 13 MPa to about 42 MPa.
9. The process according to any of paragraphs 1 to 8, wherein the pressure is of from 13 MPa to about 35 MPa.
10. The process according to any of paragraphs 1 to 9, wherein the pressure is of from 13 MPa to about 28 MPa.
11. The process according to any of paragraphs 1 to 10, wherein the pressure is of from 13 MPa to about 21 MPa.
12. The process according to any of paragraphs 1 to 11, wherein the pressure is about 13.8 MPa.
13. The process according to any of paragraphs 1 to 12, wherein the temperature is of from 80° C. to about 150° C.
14. The process according to any of paragraphs 1 to 13, wherein the temperature is of from 80° C. to about 130° C.
15. The process according to any of paragraphs 1 to 14, wherein the temperature is of from 80° C. to about 105° C.
16. The process according to any of paragraphs 1 to 15, further comprising feeding about 20 wt % or less one or more comonomers, based on total weight of propylene monomer, comonomer and diluent.
17. The process according to any of paragraphs 1 to 16, further comprising feeding about 15 wt % or less one or more comonomers, based on total weight of propylene monomer, comonomer and diluent.
18. The process according to any of paragraphs 1 to 17, wherein the diluent has a boiling point 50° C. or more than the boiling point of propylene.
19. The process according to any of paragraphs 1 to 18, wherein the diluent has a boiling point 75° C. or more than the boiling point of propylene.
20. The process according to any of paragraphs 1 to 19, wherein the diluent has a boiling point 100° C. or more than the boiling point of propylene.
21. A process for polymerizing propylene, comprising: feeding about 40 wt % to about 80 wt % propylene monomer, based on total weight of propylene monomer and diluent, and about 20 wt % to about 60 wt % diluent, based on total weight of propylene monomer and diluent, into a reactor;

polymerizing the propylene monomer in the presence of a metallocene catalyst and an activator within the reactor at a temperature of about 80° C. or more and a pressure of about 13 MPa to about 20 MPa to produce a polymer product in a homogenous system, wherein about 28 wt % to about 76 wt % propylene monomer, based on total weight of the propylene monomer, diluent, and polymer product, is present at the reactor exit at steady state conditions, and the diluent has a boiling point 50° C. or more than the boiling point of propylene.

22. The process according to paragraph 21, wherein conversion of the propylene monomer to polymer product is about 5 wt % to about 35 wt % of the propylene monomer.

23. The process according to paragraphs 21 or 22, wherein conversion of the propylene monomer to polymer product is about 15 wt % to about 35 wt % of the propylene monomer.

24. The process according to any of paragraphs 21 to 23, wherein the polymer product has a melting temperature of about 60° C. to about 160° C.

25. The process according to any of paragraphs 21 to 24, wherein the polymer product has a melting temperature of about 65° C. to about 155° C.

26. The process according to any of paragraphs 21 to 25, wherein the polymer product has a melting temperature of about 110° C. to about 160° C.

27. The process according to any of paragraphs 21 to 26, wherein the polymer product has a melting temperature of about 120° C. to about 155° C.

28. The process according to any of paragraphs 21 to 27, wherein the pressure is of from 13 MPa to about 19 MPa.

29. The process according to any of paragraphs 21 to 28, wherein the pressure is of from 13 MPa to about 17 MPa.

30. The process according to any of paragraphs 21 to 29, wherein the pressure is of from 13 MPa to about 15 MPa.

31. The process according to any of paragraphs 21 to 30, wherein the temperature is of from 80° C. to about 150° C.

32. The process according to any of paragraphs 21 to 31, wherein the temperature is of from 80° C. to about 130° C.

33. The process according to any of paragraphs 21 to 32, wherein the temperature is of from 80° C. to about 105° C.

34. The process according to any of paragraphs 21 to 33, further comprising feeding about 20 wt % or less one or more comonomers, based on total weight of propylene monomer, comonomer and diluent.

35. A process for polymerizing propylene, comprising: feeding about 40 wt % to about 80 wt % propylene monomer, based on total weight of propylene monomer and diluent, and about 20 wt % to about 60 wt % diluent, based on total weight of propylene monomer and diluent, into a reactor; polymerizing the propylene monomer in the presence of a metallocene catalyst and an activator within the reactor at a temperature of about 80° C. to about 150° C. and a pressure of about 13 MPa to about 20 MPa to produce a polymer product in a homogenous system, wherein: about 28 wt % to about 76 wt % propylene monomer, based on total weight of the propylene monomer, diluent, and polymer product, is present in the reactor at steady state conditions, conversion of the propylene monomer to polymer product is about 5 wt % to about 30 wt % of the propylene monomer, and the diluent has a boiling point 50° C. or more than the boiling point of propylene.

36. The process according to paragraph 35, wherein the polymer product has a melting temperature of about 60° C. to about 160° C.

37. The process according to paragraphs 35 or 36, wherein the temperature is of from 80° C. to about 130° C.

38. The process according to any of paragraphs 35 to 37, further comprising feeding about 20 wt % or less one or more comonomers, based on total weight of propylene monomer, comonomer and diluent.

39. The process according to any of paragraphs 35 to 38, wherein about 50 wt % to about 80 wt % propylene monomer, based on total weight of the propylene monomer and diluent, and about 20 wt % to about 50 wt % diluent, based on total weight of the propylene monomer and diluent, is fed into the reactor.

40. The process according to any of paragraphs 35 to 39, wherein about 75 wt % propylene monomer, based on total weight of the propylene monomer and diluent, and about 25 wt % diluent, based on total weight of the propylene monomer and diluent, is fed into the reactor.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated herein by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A continuous process for polymerizing propylene, comprising:
    (a) feeding about 40 wt % to about 80 wt % propylene monomer, based on total weight of propylene monomer and diluent, and about 20 wt % to about 60 wt % diluent, based on total weight of propylene monomer and diluent, into a reactor;
    (b) polymerizing the propylene monomer in the presence of a metallocene catalyst and an activator within the reactor at a temperature of about 80° C. or more and a pressure of about 13 MPa or more to produce a polymer product in a homogenous system, wherein about 20 wt % to about 76 wt % propylene monomer, based on total weight of the propylene monomer, diluent, and polymer product, is present at the reactor exit at steady state conditions and the conversion of the propylene monomer to polymer product is about 5 wt % to about 45 wt % of the propylene monomer; and
    (c) obtaining propylene polymer comprising from 0 to 30 wt % of comonomer, said propylene polymer having a melting temperature of about 120° C. or more;
wherein the polymerization temperature is above the cloud point of the single-phase polymerization system at the reactor pressure, where the polymerization system is defined to be monomer(s) plus optional comonomer(s) plus polymer product plus solvent(s)/diluent(s) plus optional scavenger(s), provided that when the comonomer is ethylene, the ethylene is present at less than 10 wt %.

2. The process of claim 1, wherein about 28 wt % to about 76 wt % propylene monomer, based on total weight of the propylene monomer, diluent, and polymer product, is present at the reactor exit at steady state conditions.

3. The process of claim 1, wherein conversion of the propylene monomer to polymer product is about 5 wt % to about 35 wt % of the propylene monomer.

4. The process of claim 1, wherein the polymer product has a melting temperature of about 120° C. to about 160° C.

5. The process of claim 1, wherein the pressure is of from 13 MPa to about 42 MPa.

6. The process of claim 1, wherein the temperature is of from 80° C. to about 130° C.

7. The process of claim 1, further comprising feeding about 20 wt % or less of one or more comonomers, based on total weight of propylene monomer, comonomer and diluent.

8. The process of claim 1, wherein the diluent has a boiling point 50° C. or more than the boiling point of propylene.

9. A continuous process for polymerizing propylene, comprising:
(a) feeding about 40 wt % to about 80 wt % propylene monomer, based on total weight of propylene monomer and diluent, and about 20 wt % to about 60 wt % diluent, based on total weight of propylene monomer and diluent, into a reactor;
(b) polymerizing the propylene monomer in the presence of a metallocene catalyst and an activator within the reactor at a temperature of about 80° C. or more and a pressure of about 13 MPa to about 20 MPa to produce a polymer product in a homogenous system, wherein about 28 wt % to about 76 wt % propylene monomer, based on total weight of the propylene monomer, diluent, and polymer product, is present at the reactor exit at steady state conditions, and the diluent has a boiling point 50° C. or more than the boiling point of propylene; and
(c) obtaining propylene polymer comprising from 0 to 30 wt % of comonomer, said propylene polymer having a melting temperature of about 120° C. or more;
wherein the polymerization temperature is above the cloud point of the single-phase polymerization system at the reactor pressure, where the polymerization system is defined to be monomer(s) plus optional comonomer(s) plus polymer product plus solvent(s)/diluent(s) plus optional scavenger(s), provided that when the comonomer is ethylene, the ethylene is present at less than 10 wt %.

10. The process of claim 9, wherein conversion of the propylene monomer to polymer product is about 5 wt % to about 35 wt % of the propylene monomer.

11. The process of claim 9, wherein the polymer product has a melting temperature of about 120° C. to about 160° C.

12. The process of claim 9, wherein the polymer product has a melting temperature of about 120° C. to about 155° C.

13. The process of claim 9, wherein the pressure is of from 13 MPa to about 19 MPa.

14. The process of claim 9, wherein the temperature is of from 80° C. to about 150° C.

15. The process of claim 9, further comprising feeding about 20 wt % or less one or more comonomers, based on total weight of propylene monomer, comonomer and diluent.

16. A process for polymerizing propylene, comprising:
(a) feeding about 40 wt % to about 80 wt % propylene monomer, based on total weight of propylene monomer and diluent, and about 20 wt % to about 60 wt % diluent, based on total weight of propylene monomer and diluent, into a reactor;
(b) polymerizing the propylene monomer in the presence of a metallocene catalyst and an activator within the reactor at a temperature of about 80° C. to about 150° C. and a pressure of about 13 MPa to about 20 MPa to produce a polymer product in a homogenous system, wherein:
about 28 wt % to about 76 wt % propylene monomer, based on total weight of the propylene monomer, diluent, and polymer product, is present in the reactor at steady state conditions,
conversion of the propylene monomer to polymer product is about 5 wt % to about 30 wt % of the propylene monomer, and
the diluent has a boiling point 50° C. or more than the boiling point of propylene; and
(c) obtaining propylene polymer comprising from 0 to 30 wt % of comonomer, said propylene polymer having a melting temperature of about 120° C. or more;
wherein the polymerization temperature is above the cloud point of the single-phase polymerization system at the reactor pressure, where the polymerization system is defined to be monomer(s) plus optional comonomer(s) plus polymer product plus solvent(s)/diluent(s) plus optional scavenger(s), provided than when the comonomer is ethylene, the ethylene is present at less than 10 wt %.

17. The process of claim 16, wherein the polymer product has a melting temperature of about 120° C. to about 160° C.

18. The process of claim 16, wherein the temperature is of from 80° C. to about 130° C.

19. The process of claim 16, further comprising feeding about 20 wt % or less one or more comonomers, based on total weight of propylene monomer, comonomer and diluent.

20. The process of claim 16, wherein about 50 wt % to about 80 wt % propylene monomer, based on total weight of the propylene monomer and diluent, and about 20 wt % to about 50 wt % diluent, based on total weight of the propylene monomer and diluent, is fed into the reactor.

21. The process of claim 16, wherein about 75 wt % propylene monomer, based on total weight of the propylene monomer and diluent, and about 25 wt % diluent, based on total weight of the propylene monomer and diluent, is fed into the reactor.

22. The process of claim 1, wherein the propylene polymer consists essentially of propylene and less than 10 weight % ethylene.

23. The process of claim 9, wherein the propylene polymer consists essentially of propylene and less than 10 weight % ethylene.

24. The process of claim 16, wherein the propylene polymer consists essentially of propylene and less than 10 weight % ethylene.

25. The process of claim 1, wherein the propylene polymer comprises less than 5 weight % ethylene.

26. The process of claim 1, wherein the propylene polymer further comprise one or more dienes at up to 5 weight %.

27. The process of claim 26, wherein the diene is selected from the group consisting of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, ethylidene norbornene, divinylbenzene, and dicyclopentadiene.

28. The process of claim 1, wherein the propylene polymer is homopolypropylene.

29. The process of claim 9, wherein the propylene polymer is homopolypropylene.

30. The process of claim 16, wherein the propylene polymer is homopolypropylene.

31. The process of claim 1, wherein the comonomer comprises 4-methylpentene-1, 1-butene, 1-hexene, 1-octene, cyclohexene, cyclooctene, hexadiene, or cyclohexadiene.

32. The process of claim 9, wherein the comonomer comprises 4-methylpentene-1, 1-butene, 1-hexene, 1-octene, cyclohexene, cyclooctene, hexadiene, or cyclohexadiene.

33. The process of claim 16, wherein the comonomer comprises 4-methylpentene-1, 1-butene, 1-hexene, 1-octene, cyclohexene, cyclooctene, hexadiene, or cyclohexadiene.

34. The process of claim 1, wherein the comonomer comprises one or more C2 or C4 to C20 linear, branched or cyclic monomers.

35. The process of claim 9, wherein the comonomer comprises one or more C2 or C4 to C20 linear, branched or cyclic monomers.

36. The process of claim 16, wherein the comonomer comprises one or more C2 or C4 to C20 linear, branched or cyclic monomers.

* * * * *